(12) United States Patent
Gale et al.

(10) Patent No.: US 6,487,495 B1
(45) Date of Patent: Nov. 26, 2002

(54) NAVIGATION APPLICATIONS USING RELATED LOCATION-REFERENCED KEYWORDS

(75) Inventors: William Gale, Oak Park; Ildiko Hegedus, Des Plaines, both of IL (US); Matthias Thorner, Budenheim (DE); Lawrence M. Kaplan, Northbrook, IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 09/585,754

(22) Filed: Jun. 2, 2000

(51) Int. Cl.[7] .............................. G01C 21/00; G01L 3/00
(52) U.S. Cl. ......................... 701/209; 701/3; 701/104; 701/10; 701/208; 701/200; 707/3; 395/12; 395/112
(58) Field of Search ................................. 701/209, 201, 701/208, 200, 202, 211, 10, 104; 340/995, 990, 988

(56) References Cited

U.S. PATENT DOCUMENTS

| | | | |
|---|---|---|---|
| 5,191,532 A | 3/1993 | Moroto et al. ............. 340/990 |
| 5,544,061 A | 8/1996 | Morimoto et al. .......... 701/208 |
| 5,699,255 A | 12/1997 | Ellis et al. ................. 340/995 |
| 5,764,906 A | 6/1998 | Edelstein et al. ........... 701/219 |
| 5,825,306 A | 10/1998 | Hiyokawa et al. .......... 340/788 |
| 5,835,907 A | 11/1998 | Newman .................... 701/10 |
| 5,839,088 A | 11/1998 | Hancock et al. ............ 701/213 |
| 5,941,930 A | 8/1999 | Morimoto et al. .......... 701/200 |
| 5,987,375 A | 11/1999 | Tamai ....................... 701/200 |
| 6,006,160 A | 12/1999 | Tamaki et al. .............. 701/208 |
| 6,023,654 A | 2/2000 | Mohlenkamp .............. 701/208 |
| 6,047,236 A | 4/2000 | Hancock et al. ............ 701/208 |
| 6,049,711 A | 4/2000 | Ben-Yeheskel et al. ..... 455/414 |
| 6,088,649 A | 7/2000 | Kadaba et al. .............. 701/701 |
| 6,091,956 A | 7/2000 | Hollenberg ................. 455/456 |
| 6,112,153 A | 8/2000 | Schaaf et al. .............. 701/200 |
| 6,115,655 A | 9/2000 | Keith et al. ................ 701/35 |
| 6,122,520 A | 9/2000 | Want et al. ................. 455/456 |
| 6,122,594 A | 9/2000 | Tamaki et al. .............. 701/208 |
| 6,148,260 A | 11/2000 | Musk et al. ................ 701/200 |

FOREIGN PATENT DOCUMENTS

EP 1 020 832 A1 7/2000 ......... G08G/1/0969

*Primary Examiner*—William A. Cuchlinski, Jr.
*Assistant Examiner*—Tuan C To
(74) *Attorney, Agent, or Firm*—Frank J. Kozak; Jon D. Shutter; Lawrence M. Kaplan

(57) ABSTRACT

An improved system and method for specifying physical locations when using applications run on navigation systems or other computer platforms that provide navigation- or map-related functions. When requesting a navigation- or map-related function from such an application, a user specifies a physical location using a keyword instead of specifying the physical location conventionally, such as by street address. A keyword database relates keywords to physical locations. The application uses the keyword database, or a copy thereof, to find data indicating the physical location associated with the keyword specified by the user. Preferably, physical locations are defined in the keyword database in terms of data in a corresponding navigable database. The application then performs the requested navigation- or map-related function using the data indicating the physical location associated with the keyword. The keyword database is built using input from users. An online system is provided that users can access to associate keywords with physical locations. A user accessing the online system is presented with a map from which a physical location can be selected. A keyword, which may be selected by the user, is associated with the selected physical location. The keyword is stored in the keyword database along with data indicating the associated physical location. Keywords can be related to each other in order to facilitate navigation applications that involve routing through multiple locations.

20 Claims, 12 Drawing Sheets

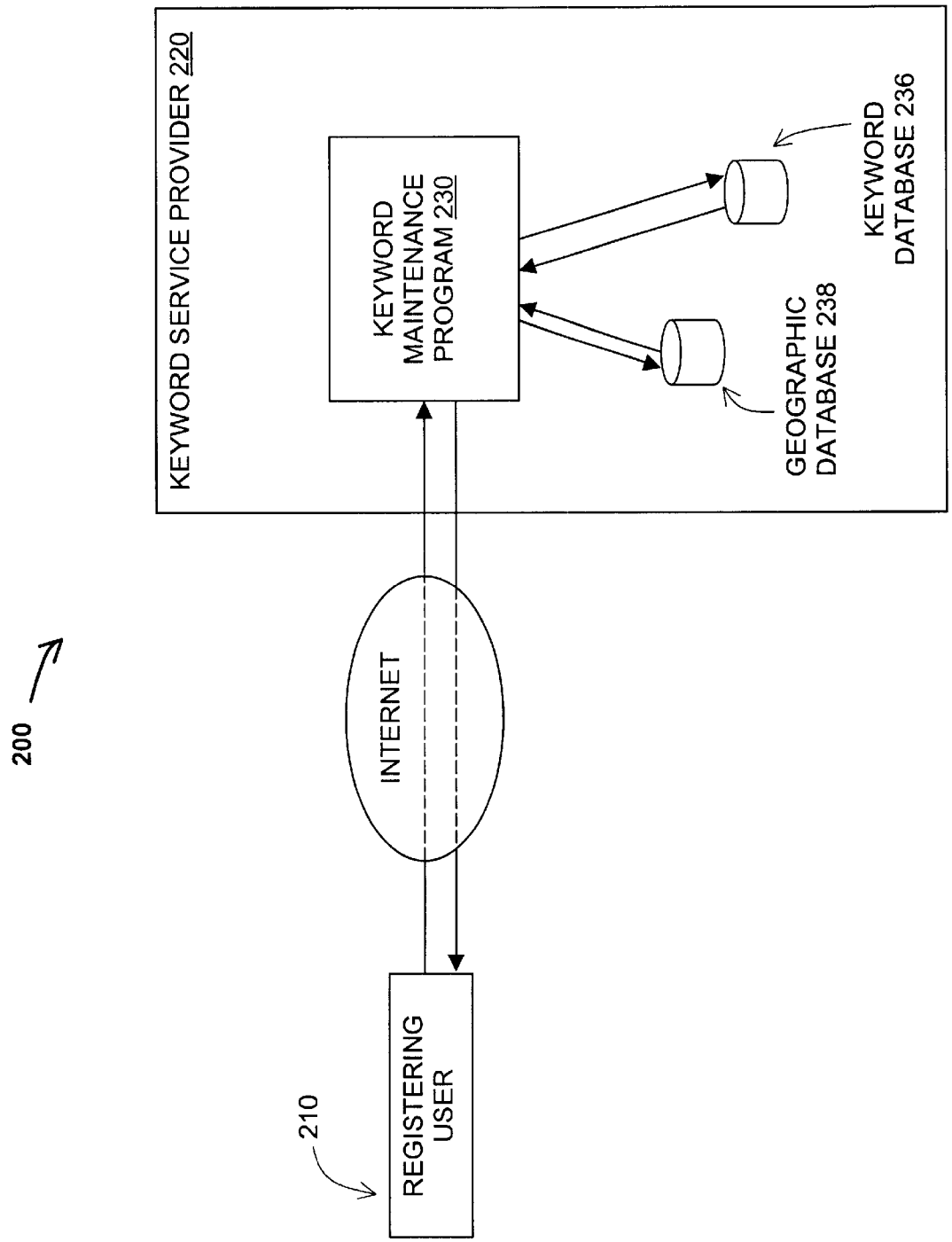

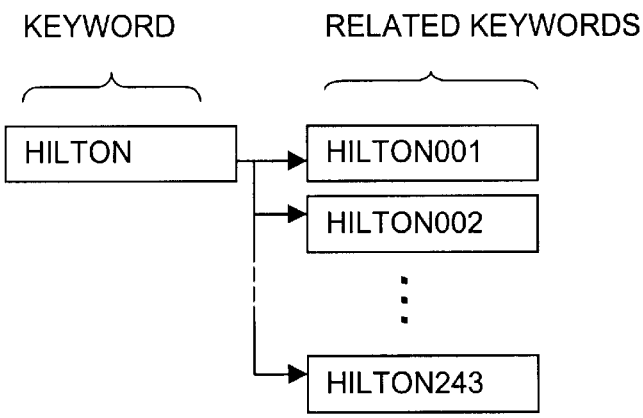
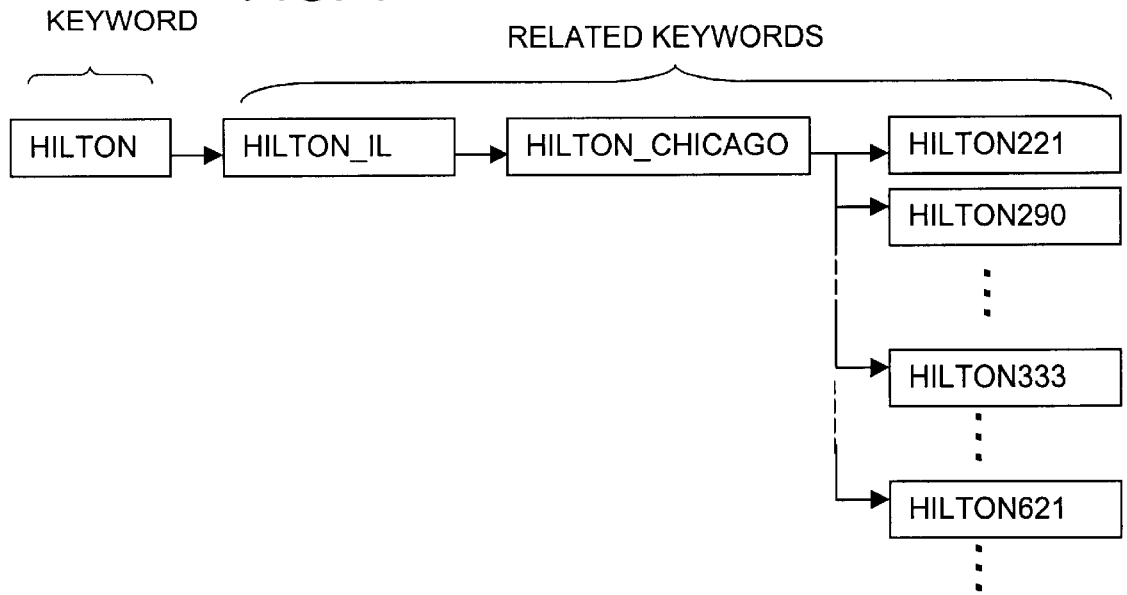

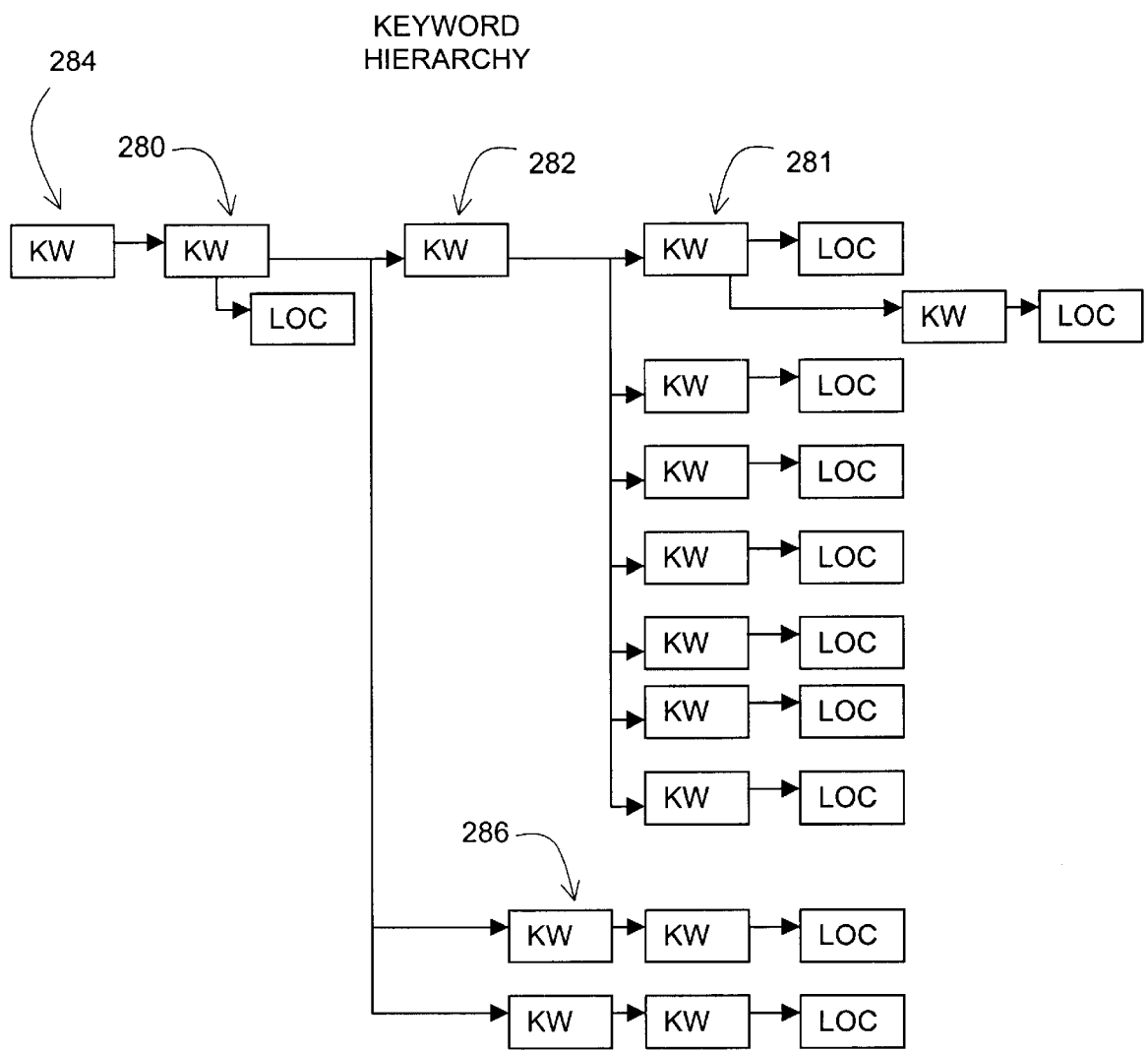

FIG. 6

KEYWORD DATABASE 236

KEYWORD RECORD 300

KEYWORD RECORD 300

KEYWORD RECORD 300

⋮

NAVIGATION APPLICATIONS USING RELATED LOCATION-REFERENCED KEYWORDS

REFERENCE TO RELATED APPLICATIONS

The present application is related to the copending application entitled "METHOD AND SYSTEM FOR FORMING A KEYWORD DATABASE FOR REFERENCING PHYSICAL LOCATIONS", Ser. No. 09/586,206, and the copending application entitled "METHOD AND SYSTEM FOR USING KEYWORDS TO SPECIFY LOCATIONS FOR NAVIGATION- AND MAP-RELATED SERVICES", Ser. No. 09/586,320, both filed on even date herewith, the entire disclosures of which are incorporated by reference herein.

BACKGROUND OF THE INVENTION

The present invention relates to systems that provide users with navigation-related or map-related features and services and more particularly the present invention relates to an innovation that facilitates the specification of physical locations when using systems that provide such features or services to users.

Various technologies have been developed that provide navigation-related and map-related services. For example, vehicle navigation systems can determine where a vehicle is located and also can provide directions to travel to a desired destination. Also, Internet sites are available that provide maps, directions for traveling to a desired destination from a specified starting point, and other map- or navigation-related services. Further, hand-held devices are available that can determine one's position and a map of one's surroundings.

Despite the various navigation-related and map-related technologies that exist, there continues to be room for improvement. One area in which there is room for improvement relates to designating a physical location when using a navigation-related or map-related device, service, or technology.

For example, when using a navigation system, Internet mapping service, or other system or service, a user often needs to specify a physical location. For example, to obtain route guidance for traveling to a destination, a user is required to specify a physical location as the desired destination. Conventional navigation systems, Internet mapping services, and the like, may provide a means by which a user can input a street, street address, cross street, or location name (e.g., O'Hare Airport) in order to specify a physical location. Although specifying a physical location in this manner works well, difficulties can occasionally arise. For example, addresses may be unknown or difficult to remember. Also, addresses can sometimes be awkward to input into a navigation system. Furthermore, relatively few locations have names by which they are known. Even further, not all points of interest may be included in the database used by the navigation system or mapping service.

Another consideration that relates to the use of address information to specify a physical location is that address information is not available for all regions. Accurate address information can be difficult to collect and maintain. Address schemes that exist in different countries, or even within the same country, are complex and inconsistent, making it difficult to create and use products for computer-assisted navigation- and map-related services. Even when address information is available, the information is not always up-to-date.

Accordingly, there is a need for a way to facilitate the specification of a physical location when obtaining navigation-related or map-related features from a computer-based system that provides such features.

SUMMARY OF THE INVENTION

To address these and other objectives, the present invention comprises an improved method and system for specifying physical locations when using applications run on navigation systems or other computer platforms that provide navigation- or map-related functions. When requesting a navigation- or map-related function from such an application, a user specifies a physical location using a keyword instead of specifying the physical location conventionally, such as by street address. A keyword database relates keywords to physical locations. The application uses the keyword database, or a copy thereof, to find data indicating the physical location associated with the keyword specified by the user. Preferably, physical locations are defined in the keyword database in terms of data in a corresponding geographic database. The application then performs the requested navigation- or map-related function using the data indicating the physical location associated with the keyword.

The keyword database is built using input from users. An on-line system is provided that users can access to associate keywords with physical locations. A user accessing the on-line system is presented with a map from which a physical location can be selected. A keyword, which may be selected by the user, is associated with the selected physical location. The keyword is stored in the keyword database along with data indicating the associated physical location.

BRIEF DESCRIPTION OF THE DRAWINGS

FIG. 2 is a block diagram of a system by which keywords used in the system of FIG. 1 are registered.

FIG. 3 is a block diagram showing how keywords can be related to each other.

FIG. 4 is another block diagram showing how keywords can be related to each other.

FIG. 5 is another block diagram showing how keywords can be related to each other in a related keyword hierarchy.

FIG. 6 is a block diagram showing components of the keyword database shown in FIG. 2.

DETAILED DESCRIPTION OF THE PRESENTLY PREFERRED EMBODIMENTS

I. Overview

Figure 1:
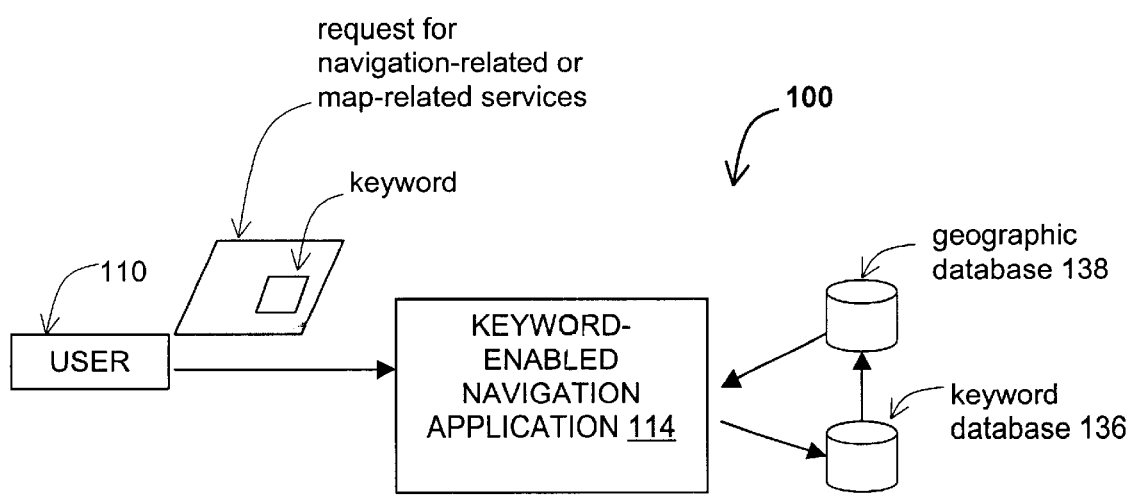
FIG. 1 is a block diagram of an overview of a system for specifying location information using keywords.

FIG. 1 shows an overview of a system 100 that provides navigation- or map-related features and that accepts keywords for the specification of physical locations when accepting requests for such navigation- or map-related features. Systems that provide navigation-related or map-related features include navigation systems, Internet routing services, Internet mapping services, wireless server-based navigation systems, or any other type of navigation or mapping service, product, device or system. With the system 100 of FIG. 1, a user 110 requests navigation- or map-related services from a keyword-enabled navigation application 114. The keyword-enabled navigation application 114 may be part of a vehicle navigation system, an Internet routing service, an Internet mapping service, a wireless server-based navigation system, a hand-held personal digital assistant having navigation-related capabilities, a cellular phone (or any type of wireless phone) having navigation-related or map-related capabilities, or other type of navigation or mapping service, product, device or system. The keyword-enabled navigation application 114 is able to accept keywords to specify locations, A "keyword" is an alphanumeric word, string, or phrase. The keyword-enabled application 114 is able to use keywords for specifying physical locations in connection with any type of navigation-related or map-related feature requested by the user 110. For example, the keyword may be used to specify a destination to which routing instructions are desired by the user 110. Alternatively, the keyword may be used to specify a location for which a map is desired. Using keywords simplifies the way that users interface with systems that provide navigation-related or map-related services.

When the user 110 specifies a location using a keyword when requesting a navigation-or map-related feature, the keyword-enabled application 114 uses a keyword database 136 to find data indicating a physical location associated with the keyword. Then, the navigation application 114 performs the requested navigation- or map-related feature using the data indicating the physical location associated with the keyword. The navigation application 114 may use a geographic database 138 when performing the requested navigation- or map-related feature. Then, the navigation application 114 provides the requested navigation- or map-related feature to the user.

In one embodiment, the keyword-enabled navigation application 114 is also able to accept the specification of physical locations by other (e.g., conventional) means, such as by street address number, street, intersection, name, etc., in addition to accepting keywords for the specification of physical locations. Thus, a user can use keywords to specify physical locations when such keywords are known and available, but otherwise can use conventional means to specify physical locations.

II. Registering Keywords

A. The Keyword Service Provider

In order to use the keyword system 100 of FIG. 1, a means is provided by which keywords are registered. FIG. 2 shows a system 200 by which persons can register keywords. Registering a keyword includes the step of associating an alphanumeric string (of which the keyword is composed) with a map location in a geographic database. (A "geographic database" is a database containing data that represent roads and other physical geographic features. In a preferred embodiment, the geographic database contains navigable attributes about roads, i.e., data by which routes for travel by vehicle between locations along the roads can be calculated. The "vehicle" for which routes can be calculated includes motorized vehicles, such as automobiles, trucks, buses, motorcycles, but the geographic database may also include data for which routes can be calculated for travel by bicycle, by foot, by public transportation, or other means.)

According to the system 200 of FIG. 2, a person 210 (labeled a "REGISTERING USER" in FIG. 2) desires to register a keyword. The person 210 may be a business, an individual, a government agency, and so on. The person 210 accesses a keyword service provider 220. The keyword service provider 220 includes a keyword maintenance program 230, a keyword database 236, and a geographic database 238. (The keyword database 236 and geographic database 238 in FIG. 2 may correspond to the keyword database 136 and geographic database 138, respectively, in FIG. 1.)

The keyword maintenance program 230 allows the person 210 to define a keyword and to have the keyword associated with a map location defined in terms of the geographic database 238. The person 210 can access the keyword maintenance program 230 by any means, electronic or otherwise. For example, the person 210 can use a software application (e.g., a browser or an applet) to access the keyword maintenance program 230 via the Internet, a private network, a dial-up service, an on-line provider (such as AOL), or various other means. The software application used by the person 210 to access the keyword maintenance program 230 may use a messaging protocol to interact with the keyword maintenance program 230.

The keyword maintenance program 230 provides the following features.

(1) The keyword maintenance program 230 allows the person 210 to propose a keyword. A feature of a keyword is that it is unique. Thus, one of the functions performed by the keyword maintenance program 230 is that it checks whether the proposed keyword has already been registered by someone else. If the proposed keyword has already been registered to someone else, it is therefore unavailable and the keyword maintenance program 230 informs the user of the unavailability of the proposed keyword. If the proposed keyword has not already been registered by someone else, the keyword maintenance program 230 informs the person 210 that the keyword is available.

(2) In an alternative embodiment, the keyword maintenance program 230 includes a feature by which a person desiring a keyword can have the keyword maintenance program automatically generate a unique keyword. (A program for automatically generating keywords may be similar to programs for automatically generating passwords. Such programs are known to those of skill in the art.) After automatically generating a unique keyword, the keyword maintenance program 230 informs the person of the keyword.

(3) In another alternative, the keyword program may pre-select part of the keyword and let the user define the remainder of the keyword. According to this alternative, a keyword registration service may offer its customers free registration (or other benefits) if they register locations with keywords that include the prefix provided by the service. As an example, the keyword registration service program may provide the prefix "XYZDOTCOM" to which a user can add "ABCUSER" so that the resultant keyword is "XYZDOTCOM/ABCUSER".

(4) In addition to selection of a keyword, the keyword maintenance program 230 provides a means by which the person registering the keyword can associate the keyword with a map location. Persons can register their homes, business locations, or any location to which they want navigation-related or map-related services provided—either for themselves or others. (Although keywords are unique, more than one keyword can refer to the same specific map location represented by a data record in a geographic database.)

The keyword maintenance program 230 includes several ways by which a keyword may be associated with a map location.

(a) In one alternative, the keyword maintenance program 230 displays a map image, e.g., of roads and intersections located in a geographic area, on the person's computer display screen. The map image can be panned and zoomed so that the person registering the keyword can locate a particular location along a road segment portrayed on the map image. Once the location that the person desires to be associated with the keyword is displayed on the person's computer display screen, the person can associate the keyword with the location by moving a cursor over the location and clicking on it. When choosing the location to associate with a keyword, the person can choose the best location by which a place can be entered. For example, if a business has a street address at one location, but a parking lot at another location, the keyword can be associated with the entrance to the parking lot, thereby providing the best quality location for routing purposes.

(b) According to another alternative, the keyword maintenance program 230 allows the person desiring to register a keyword to specify a street address. To accommodate this type of location selection, the keyword maintenance program provides input fields into which the person can enter an address.

(c) In another alternative, the keyword maintenance program allows the person to specify the geographical coordinates (i.e., latitude, longitude, and optionally altitude) of the location to be associated with the keyword being registered. To accommodate this type of location selection, the keyword maintenance program 230 may provide a map image, e.g., of roads and intersections located in a geographic area, on a graphical computer display from which the person can select a point using a pointing device. Alternatively, to accommodate this type of location selection, the keyword maintenance program 230 may provide input fields into which the person can enter geographic coordinates. The keyword maintenance program may use a coordinate system by default, such as WGS84. If the person registering the keyword prefers to enter the geographic coordinates in a coordinate system other than the coordinate system in which the geographic database is maintained, the input coordinates may be translated. If altitude is entered, the altitude may be specified as an elevation (e.g., distance above sea level) or a relative or scaled altitude (e.g., 0 corresponds to ground level, +1 corresponds to a first street level above ground level, and so on).

If a person registering a keyword selects a location to be associated with the keyword by street address (i.e., (b), above) or by geographic coordinates (i.e., (c), above), the keyword maintenance program 230 may automatically determine a map location in the geographic database 238 (e.g., a position and side along a road segment represented by data in the geographic database 238) to be associated with the street address or geographic coordinates and save the geographic database map location with the keyword data. Also, if a person registering a keyword selects a location to be associated with the keyword by street address, the keyword maintenance program 230 may automatically determine the geographic coordinates associated with the street address and save the geographic coordinates with the keyword data. Likewise, if a person registering a keyword selects a location to be associated with the keyword by geographic coordinates, the keyword maintenance program 230 may automatically determine the street address associated with the geographic coordinates and save the street address with the keyword data. Similarly, if a person registering a keyword selects a location to be associated with the keyword by identification of a position and side of a road segment represented by data in a geographic database (i.e., (a), above), the keyword maintenance program 230 may automatically determine the street address and/or the geographic coordinates associated with the geographic database map location and save the street address and geographic coordinates with the keyword data.

Once the person registers a keyword, the person becomes the "owner" of the keyword.

(5) Once a keyword is registered, the keyword maintenance program 230 provides a means by which the owner of the keyword can modify, update or delete the keyword, or any of the information associated with the keyword. For example, the owner of a keyword may change the location associated with the keyword. The owner of the keyword may delete the keyword (thereby making the keyword available to someone else). (The owner may also change a keyword relationship, which are described in the following section.)

B. Related Keywords

Instead of referring directly to a map location, a keyword may refer to another keyword. Two keywords are related if one refers to the other. According to one embodiment, a keyword that refers to another keyword has a parent keyword relationship with respect to the other keyword. According to this embodiment, the keyword that is referred to by another keyword has a child keyword relationship with respect to the other keyword. A keyword may refer to more than one other keyword (i.e., a parent keyword with plural children keywords). Likewise, a keyword may be referred to by more than one other keyword (i.e., a child keyword with plural parent keywords). Keyword relationships may have multiple generations. A keyword that has a child relationship with respect to another keyword may have a parent relationship with respect to a third keyword (e.g., a first keyword may refer to a second keyword which refers to a third keyword, and so on).

A keyword may refer to both another keyword and a map location.

A keyword that does not refer to another keyword refers to a map location.

The map location associated with a keyword is directly referred to by the keyword. The map location associated with a child keyword (of any generation) is indirectly referred to by a keyword. Accordingly, a keyword either directly or indirectly refers to at least one map location.

The keyword database provides for storing data that describes the relationships between related keywords. Using related keywords, a hierarchy of keywords may be built. FIG. 5 illustrates keyword relationships represented in the keyword database. A keyword 282 refers to multiple other keywords. A keyword 280 is a child keyword of keyword 284 and a parent of keyword 282. The keyword 280 refers both to another keyword 282 and a map location reference. A keyword 286 refers only to another keyword but not directly to a map location reference.

The keyword maintenance program 230 provides support for defining related keywords. According to this alternative, the keyword maintenance program 230 allows a person registering a keyword to build a list of related keywords and define relationships between keywords. Each keyword on the list of related keywords can be associated with a separate map location that can be selected by the registering person.

Business chains can use related keywords to identify different locations of the business chain. An example is shown in FIG. 3.

In further embodiments, the related keywords can be organized in a hierarchy or database. An example is shown in FIG. 4. According to the hierarchy shown in FIG. 4, the keyword maintenance program 230 allows a business chain to automatically build a set of keywords from existing point-of-interest information. For example, a keyword is constructed from the chain name (i.e., "HILTON") and the chain identifier for each location (e.g., hotel #23), to produce the keyword ("HILTON23").

C. Special Classes of Keywords

In addition to the types of keywords described in the foregoing section (i.e., "regular keywords"), an alternative embodiment includes special classes of keywords. Included among these special classes of keywords are multiple location keywords and area-referenced keywords.

(1). Multiple Location Keywords

A regular keyword is directly associated with no more than one location. A multiple location keyword is directly associated with more than one location. A multiple location keyword is a shortcut way to associate more than one location with a keyword. Associating more than one location with a single keyword can be accomplished using regular keywords by defining related child keywords for each of the multiple locations so that the single keyword refers to the multiple locations indirectly. The multiple location keyword allows these locations to be directly associated with the keyword thereby obviating the need to define the related child keywords.

(2). Area-referenced Keywords

A regular keyword is directly associated with one location which generally corresponds to a point. An area-referenced keyword refers to an area. The area may be a two dimensional area of any defined geometry, e.g., a circular area of a given radius, a rectangular area of given boundaries, or any other user-defined or pre-defined shape. The area may be an administrative area, e.g., "Chicago", "California", etc. (The "area" may also be three-dimensional, i.e., by specifying an altitude range or elevation.)

D. Password Protection for Keywords

Another feature that the keyword maintenance program 230 provides is support for password protection for keywords. According to this feature, the keyword maintenance program 230 allows a person registering a keyword to associate a password with the keyword information. Password protection for keywords is an option that a person registering a keyword may select. Password protection restricts access to the information (i.e., the map location information) associated with a keyword to those who provide the password. For example, a person registering a keyword that identifies a location for a lunch meeting may password protect the keyword so that only those who are invited could access where they would meet for lunch.

As an additional level of protection, the keyword information is encrypted on the server of the keyword service provider 220. Existing encryption/decryption technology (public-private key) may be used.

E. The Keyword Database

As stated above, the keyword service provider 220 maintains the keyword database 236. The keyword database 236 stores the registered keywords and associated information obtained through the keyword maintenance program 230. In one embodiment, the keyword database 236 includes a keyword record (or data entity) for each registered keyword. FIG. 6 illustrates the keyword database 236 including a plurality of keyword records. In one embodiment, the keyword database 236 includes an unnormalized record for each registered keyword, where each record holds all the information associated with a registered keyword. In alternative embodiments, the keyword database 236 may have any other type of structure or may be compressed.

Figure 7:
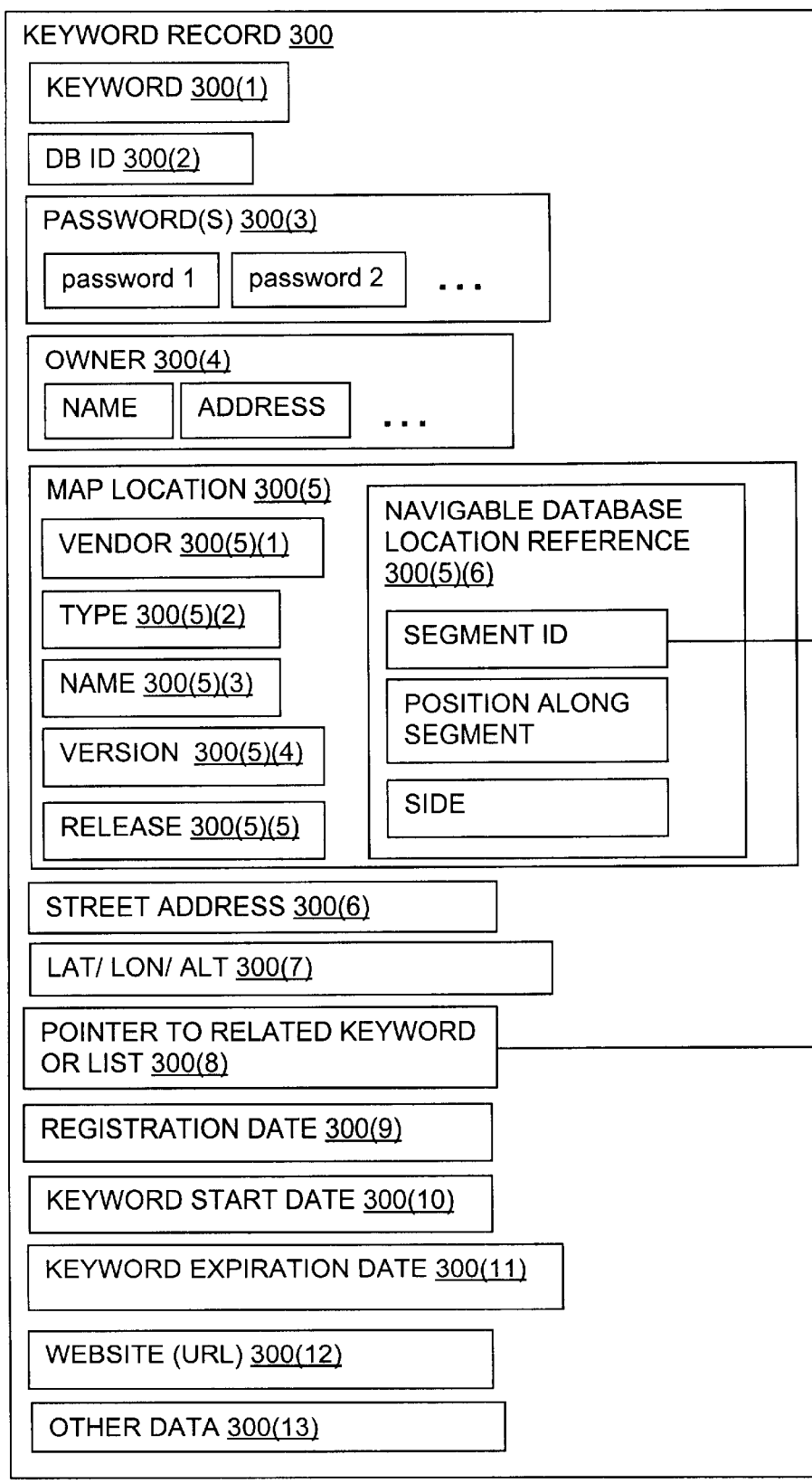
FIG. 7 is a block diagram showing components of the keyword data record shown in FIG. 6.

FIG. 7 shows a diagram of an example of a keyword record 300 that is stored in the keyword database 236. The keyword record 300 includes (or is otherwise associated with) data that contain the attributes of the keyword. The attributes of the keyword are contained in a plurality of fields or other data structures.

In the embodiment of FIG. 7, the keyword record 300 includes a data field 300(1) that contains the alphanumeric text of the keyword (i.e., the keyword itself). As mentioned above, a keyword is a unique identifier that is associated with a physical location defined with respect to a geographic database. The keyword can be a phone number, an email address, a web address, or any other name, or can be a unique randomly-generated number or alphanumeric string.

Optionally, the keyword record 300 also includes a field containing a database ID 300(2). The database ID 300(2) contains a unique identification for the keyword record 300 in the keyword database 236.

The keyword record 300 may include password data 300(3). As mentioned above, a person who registers a keyword may include a password that restricts access to some or all the information associated with the keyword. This password is contained in the password data field(s) 300(3).

The keyword record 300 includes keyword owner data 300(4). The keyword owner data 300(4) contains the name of, and optionally other information about, the person or business that registered the keyword. For example, the keyword owner data 300(4) may contain the address, phone number, e-mail address, owner password, or other information about the person who registered the keyword. The owner password restricts unauthorized changes to be made to the keyword record (e.g., password changes, owner information changes, map location changes, keyword category changes). If the keyword is registered by a business, the keyword owner data 300(4) may include the name of the business and a point of contact at the business.

The keyword record 300 also includes map location data (or fields) 300(5). As stated above, each keyword stored in the keyword database 236 is preferably associated with a map location defined with respect to a geographic database. Data indicating the map location data associated with a keyword are stored in the map location field 300(5). The map location field includes some or all of the following types of data: an identification of the geographic database vendor 300(5)(1), a geographic database type 300(5)(2), a geographic database name 300(5)(3), a geographic database version 300(5)(4), a geographic database release 300(5)(5), and a map-specific location 300(5)(6). The geographic map vendor data field 300(5)(1) includes the name or ID of the vendor or publisher of the related geographic database (i.e., 238 in FIG. 2). For example, the geographic database vendor data field 300(5)(1) may identify "Navigation Technologies Corporation" of Rosemont, Ill. as the geographic database vendor. The geographic database type data field 300(5)(2) identifies the format or other manner of representation of the related geographic database. The geographic database name data field 300(5)(3) includes an identification of the name of the related geographic database, e.g., "Midwest", "New York", etc. The geographic database version data field 300(5)(4) identifies the version of the related geographic database 238, e.g., "1.7." The geographic database release data field 300(5)(5) identifies the release number of the related geographic database, e.g., "1.7.15." The map-specific location data field 300(5)(6) identifies a particular location defined with respect to the data contained in the geographic database. For example, the map-specific location data field 300(5)(6) may identify a road segment represented in the geographic database (238 in FIG. 2). The road segment may be represented by a segment (or link) ID. In addition, the map-specific location data field may identify a particular location along a road segment, e.g., a distance from one end of the road segment. The distance may be specified in meters (or feet), a percentage of the length of the road segment or a fractional length of the road segment, e.g., $n/256_{th}$. The map-specific location data field 305(5)(6) also includes data indicating a side of the road segment associated with the location associated with the represented keyword. (The side of the road segment may be needed for route navigation purposes because some locations cannot be accessed from the opposite side of the street because of the presence of road median barriers, turn restrictions, etc.)

The keyword record 300 of FIG. 7 may include data 300(6) indicating a street address associated with the keyword. As mentioned above, a person registering a keyword may choose to define the physical location to be associated with the keyword by using a street address. If the person registering a keyword chooses to define the physical location to be associated with the keyword by using a street address, the street address information is stored in the street address data field 300(6). The street address information 300(6) may be included in addition to the map-specific location data 300(5)(6).

The keyword record 300 of FIG. 7 may include latitude/longitude data 300(7). As mentioned above, a person registering a keyword may choose to define the physical location to be associated with the keyword by using latitude and longitude (and optionally, altitude) coordinates. If the person registering a keyword chooses to define the physical location associated with the keyword by using latitude, longitude, and altitude coordinates, this information is stored in the latitude/longitude data field 300(7). The person registering the keyword may choose to use the same coordinate system as the keyword database, such as WGS84, or may use a different coordinate system. If a different coordinate system is used, the coordinates may be translated. The latitude/longitude data 300(7) may be included in addition to the map-specific location data 300(5)(6) and/or the street address information 300(6).

As mentioned above, the person registering a keyword may choose to relate the keyword to other keywords. If the keyword record 300 represents a keyword that is related to other keywords, the keyword record 300 includes data 300(8) indicating the related keywords. The data indicating other keywords may include a listing of the other keywords or may include a pointer to the other keywords or to a list of other keywords.

The keyword record 300 of FIG. 7 may include data indicating a keyword registration date 300(9). The keyword registration date is the date on which the keyword was registered.

The keyword record 300 of FIG. 7 may include data indicating a keyword start date 300(10). The keyword start date is the date on which the keyword becomes effective. Until a keyword is effective, it cannot be used for location determining purposes, as explained below.

The keyword record 300 of FIG. 7 may include data indicating a keyword expiration date 300(11). The keyword expiration date is the date on which the keyword expires. When a keyword expires, it is no longer effective for location determining purposes, as explained below. A keyword expiration date may be determined by the person registering the keyword or the keyword expiration date may be determined by the keyword service provider 220.

The keyword record 300 of FIG. 7 may include data 300(12) indicating a website (URL) or other Internet address (e.g., an email address) associated with the keyword. The website information is provided by the person registering the keyword.

The keyword record 300 of FIG. 7 may include (or point to) other data 300(13).

F. Categorization of Keyword-referenced Locations

According to one embodiment, a subject matter category may be associated with a keyword. The subject matter category may be associated with a keyword at the time it is registered, or alternatively the subject matter category may be associated with the keyword at a time after it is registered.

The subject matter category of a keyword refers to the location associated with a keyword. The subject matter category identifies the type of location that is at the location associated with the keyword. For example, the subject matter category may include such information as "residence", "business", "commercial", "non-commercial", "government", "military", "not-for-profit", etc. The subject matter category may also include information such as "hotel", "restaurant", "gas station", "ATM", and so on.

The subject matter category associated with a keyword may include more than one category of subject matter. For example, a hotel that has a restaurant, ATM, and garage, all at one location, may include "commercial", "hotel", "restaurant", "ATM", and "garage" in the subject matter category of the keyword associated with the location of the hotel.

In one embodiment, the subject matter category to be associated with a keyword is determined by the person registering the keyword. In another embodiment the subject matter category to be associated with a keyword is determined by the keyword service provider. In yet another embodiment, both the keyword service provider and the person registering the keyword may determine a subject matter category to associate with a keyword.

To allow a person registering a keyword to choose a subject matter category, the keyword maintenance program may present the person registering the keyword with a list or menu of pre-defined categories when a keyword is registered. The person registering a keyword is requested to choose one or more of the categories to associate with the keyword being registered. The list of pre-defined categories may be hierarchical so that the selection of one category causes a sub-category to be presented. For example, a person registering a keyword for a restaurant location may first be presented with the categories "commercial", "non-commercial", "government", etc. After selecting "commercial", the person is presented with a menu listing the categories "hotel", "gas station", "bank", "restaurant", etc. After selecting "restaurant", the person is presented with a menu listing the categories "Chinese", "Italian", "Mexican", etc.

In one embodiment, a person registering a keyword may define his or her own subject matter category or categories to be associated with the keyword. These user-defined subject matter categories may be actual categories, e.g., "commercial", "bank", and so on, or may be words made up by the person registering the keyword. User-defined keywords may also be hierarchical so that one category may have one or more sub-categories, etc. Having the person registering a keyword chose his or her own subject matter category may be provided in addition to the presentation of pre-defined categories. Alternatively, having the person registering a keyword choose his or her own subject matter category may be provided as an alternative to the presentation of predefined subject matter categories.

A person registering a keyword may choose to have the keyword registered without a subject matter category.

Figure 8:
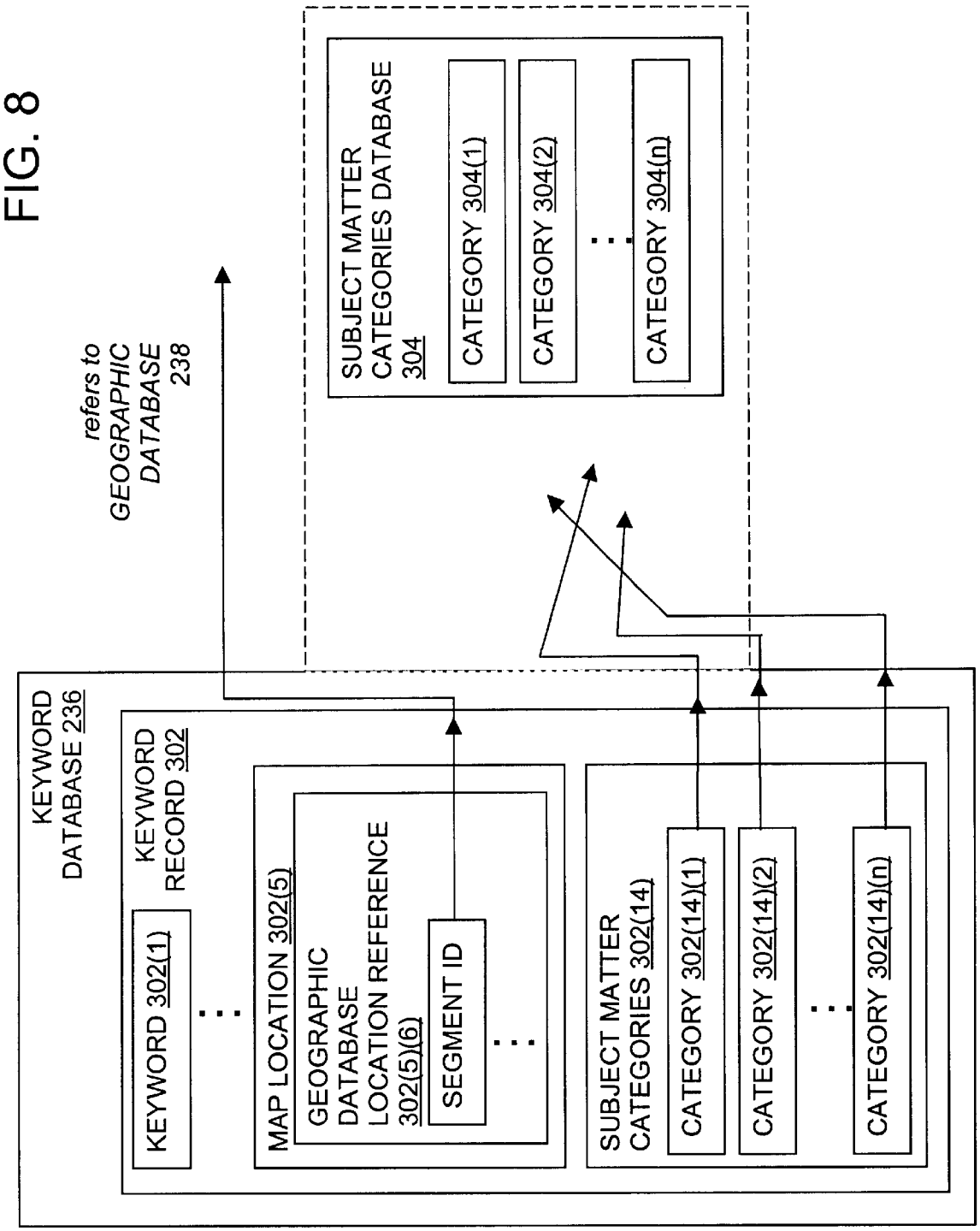
FIG. 8 is a block diagram showing additional components of an alternative embodiment of the keyword data record shown in FIG. 6.

FIG. 8 shows components of a keyword record 302 that includes a subject matter category field 302(14). The keyword record 302 may be similar to the keyword record 300 shown in FIG. 7 and may include all the types of data attributes described in connection with FIG. 7 as well as a subject matter category field 302(14). The subject matter category field 302(14) may reference or point to a subject matter category database (or index) 304 that contains the pre-defined, and optionally, the user-defined, subject matter categories. The subject matter category database 304 may be part of, or related to, the keyword database or alternatively, the subject matter category database may be a separate database. The subject matter database 304 may be organized and indexed to facilitate searches of keywords by subject matter category and subject matter hierarchy.

III. Using Keywords to Obtain Navigation-Related or Map-Related Services

A. Server Side Applications

Figure 9:
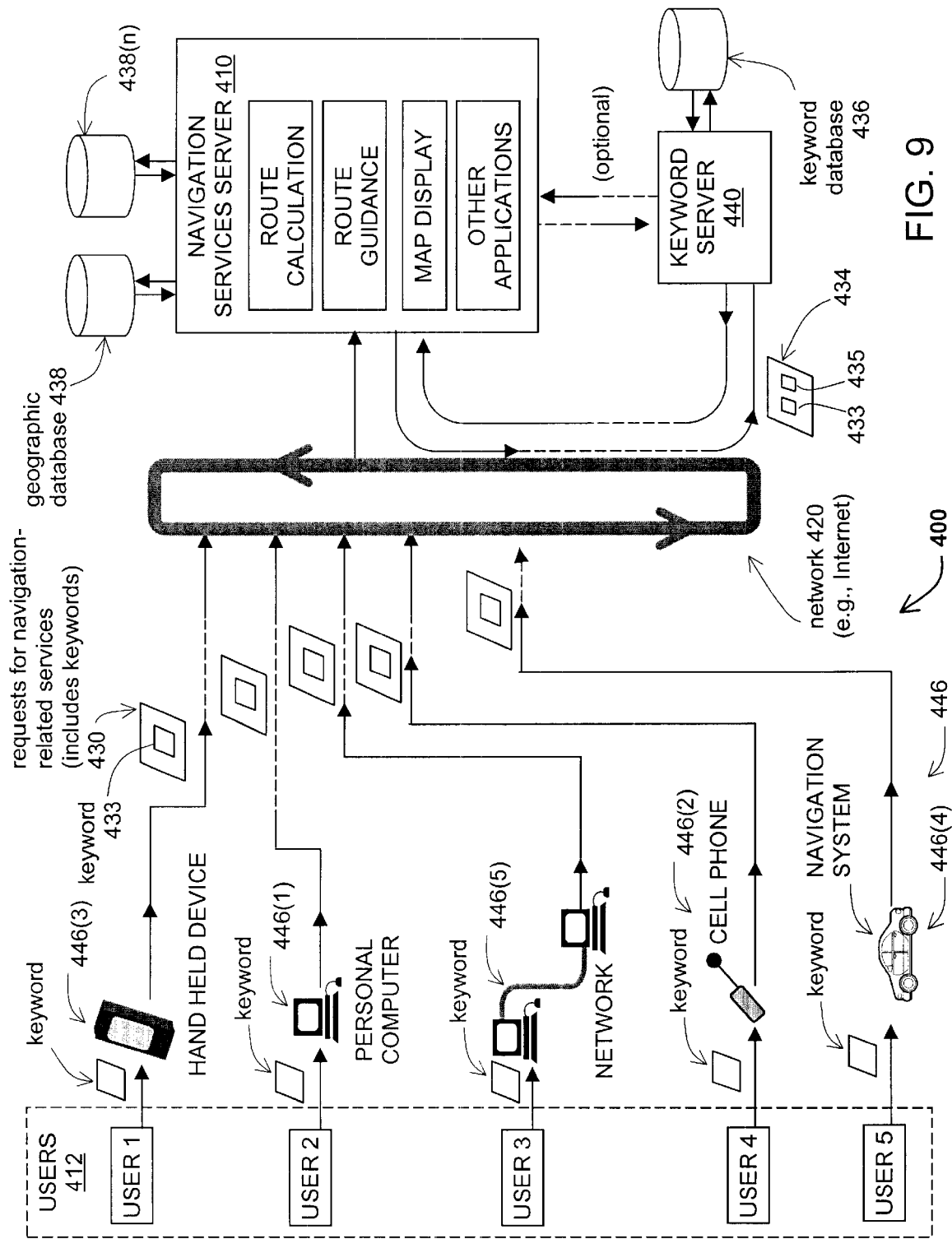
FIG. 9 is a block diagram of a first embodiment of a system that provides navigation- or map-related features and that accepts keywords for the specification of physical locations when accepting requests for such navigation- or map-related features.

FIG. 9 shows an embodiment 400 of a system for using keywords to obtain navigation- or map-related services. According to one embodiment, the keywords used in the system of FIG. 9 have been registered using the embodiment of FIG. 2 or another system. The system 400 in FIG. 9 is a server-based system. The system 400 of FIG. 9 includes a navigation services server 410 and a keyword server 440. (In the embodiment of FIG. 9, the navigation services server 410 and the keyword server 440 perform the functions of the keyword-enabled application 114 in FIG. 1.)

The navigation services server 410 is accessible to users 412 over a network 420. (In the embodiment of FIG. 9, the users 412 include individuals, businesses, etc., who want to use keywords in the process of obtaining navigation- or map-related services. The users 410 in FIG. 9 may include some of the users 110 in FIG. 2 who registered keywords, as well as others.)

In one embodiment, the network 420 in FIG. 9 is the Internet, but in alternative embodiments, the network 420 may be any type of network. The users 412 access the navigation services server 410 from any platform 446 that can access the network 420. For example, the users 412 may use personal computers 446(1), cellular phones (or any other type of wireless phone) 446(2), personal digital assistants 446(3), vehicle navigation systems 446(4), networks 446(5), personal navigation systems, and so on.

Some or all of the systems 446 may include positioning hardware and software (e.g., GPS and/or dead reckoning) by which the position of the system 446 may be determined. The position of the system may be determined as geographic coordinates or as a map location (e.g., a position relative to a road network).

The navigation services server 410 provides one or more navigation- or map-related services to the users 412 upon request. The navigation- or map-related services may include route calculation, route guidance, electronic yellow pages, and map display. Other navigation- or map-related services may also be provided.

In the embodiment of FIG. 9, each of the users 412 sends a request 430 for navigation- or map-related services using a respective platform 446. The request 430 may be in a specific format or conform to a specific messaging protocol. The request 430 includes a keyword 433. The keyword 433 in the request 430 is used to specify a physical location. According to one example, the request may be for driving directions to a destination and the keyword is used to specify the destination. In this embodiment, the navigation services server 410 receives the request 430 and extracts the keyword 433. The navigation services service 410 sends a query 434 to the keyword server 440 that includes the keyword 433. The query 434 may also include an identification 435 of the geographic database to which the keyword 433 is referenced. (As mentioned below in connection with FIG. 13, a keyword may be associated with map location defined with respect to more than one geographic database.) The keyword server 440 may be at the same location as the navigation services server 410 or may be at a different location and coupled to the navigation services server 410 over a network (which may be the network 420 or a different network).

The keyword server 440 receives the query 434 from the navigation services server 410 and accesses a keyword database 436 to obtain the map location data (300(5) in FIG. 7) associated with the keyword 433. (The keyword database 436 may be the same as the keyword database 236 in FIG. 2 or may be a copy thereof or include some or all of the same data.) The map location data 300(5) may include the geographic database location reference data (300(5)(6)), if available, or if the geographic database location reference data are not available, other components of the keyword record may be returned, such as the street address (300(6) in FIG. 7) if available, the latitude and longitude coordinate data (i.e., 300(7) in FIG. 7) if available, and so on. The keyword server 440 then returns the keyword information to the navigation services server 410.

When the navigation services server 410 receives the geographic database location reference data 300(5)(6) from the keyword server 440, the navigation services server 410 uses the geographic database location reference data 300(5)(6) in an appropriate navigation application to provide the navigation- or map-related service requested by the user 412. The navigation services server 410 may include or be associated with a geographic database 438 (or more than one geographic database 438(n)) that can be accessed and used by the appropriate navigation application for these purposes. (The geographic database 438 may be the same as the geographic database 238 in FIG. 2 or may be a copy thereof or include some or all of the same data.) For example, if the user 412 sent a request to the navigation services server 410 requesting calculation of a route to a destination and specified the destination using the keyword 433, the navigation services server 410 would use the geographic database location reference data 300(5)(6) associated with the keyword 433, which had been obtained from the keyword server 440, as the destination in a route calculation application. The route calculation application on the navigation services server 410 would use the geographic database location reference data 300(5)(6) obtained from the keyword server 440 as the destination location when calculating a route.

After using the geographic database location reference data 300(5)(6) in an appropriate navigation application, the navigation services server 410 provides the requested navigation- or map-related service to the user 412. According to the foregoing example, if the user 412 had requested calculation of a route to a destination, the navigation services server 410 would provide the user 412 with data indicating the route calculated by the route calculation application.

As stated above, the navigation services server 410 may provide various different navigation-related and map-related applications, including map display, electronic yellow pages, routing guidance, etc. Each these applications may have access to and use the geographic database 438 associated with the navigation server 410 for these purposes. For example, if the user had requested a map to a destination specified by a keyword, the navigation server 410 would use the keyword to obtain the map location data in order to present the proper map to the user.

As stated above, the keyword database 436 associated with the keyword server 440 may not necessarily have geographic database location reference data 300(5)(6) associated with all the keywords stored therein. Therefore, the keyword server 440 may not be able to return geographic database location reference data 300(5)(6) when queried by the navigation services server 410 for geographic database location reference data associated with a particular keyword. According to one embodiment, the keyword server 440 may return other types of data associated with the keyword if geographic database location reference data 300(5)(6) are not available. According to this embodiment, if the keyword server 440 finds that the keyword database 436 does not have geographic database location reference data 300(5)(6) associated with a particular keyword contained in a query from the navigation services server 410, but that the keyword database 436 has street address data 300(6) and latitude and longitude data 300(7) associated with the keyword, the keyword server 440 forwards the street address data 300(6) and latitude and longitude data 300(7) to the navigation services server 410. When the navigation services server 410 receives the street address data 300(6) and latitude and longitude coordinate data 300(7) instead of geographic database location reference data 300(5)(6) from the keyword server 440, the navigation services server 410 uses the street address data 300(6) in an application (e.g., a geo-coding application) to obtain a map-referenced position (i.e., a position referenced in terms of data in a geographic database) which in turn is used in the appropriate navigation application to provide the requested navigation or map-related service, as described above. (Street address data are preferred to latitude and longitude coordinate data because street address data may be geo-coded more accurately, e.g., to a side of a street.) When the navigation services server 410 uses a geo-coding application to obtain a map-referenced position from street address data 300(6), the latitude and longitude coordinate data 300(7) received from the keyword server may be used to determine whether the map-referenced position obtained by geo-coding the street address data is reliable. For example, if the map-referenced position obtained by geo-coding the street address data 3006) is not close to (i.e., within a specified configurable distance) of the position defined by geo-coding the latitude and longitude data 300(7), then the geo-coding of the street address may be determined to be unreliable. If the geo-coding of the street address data is not reliable, the map-referenced position determined by geo-coding the latitude and longitude data 300(7) is used by the appropriate navigation application to provide the requested navigation- or map-related service.

Referring back to a prior step, if the keyword server finds that the keyword database does not have either geographic database location reference data 300(5)(6) or street address data 300(6) associated a particular keyword contained in a query from the navigation services server, the keyword server 440 returns the latitude and longitude coordinate data 300(7), if available, to the navigation services server. The latitude and longitude data 300(7) are geo-coded, as described above, to obtain a map-referenced position which is then used by the appropriate navigation application to provide the requested navigation- or map-related service.

In the embodiment of FIG. 9, the navigation services server 410 and the keyword server 440 are shown as separate servers. In an alternative version of this embodiment, the functions of the navigation services server 410 and the keyword server 440 can be implemented on the same server. If the navigation services server 410 and the keyword server 440 are on the same server, they may be implemented as separate applications.

In an alternative embodiment, the functions of the keyword server 440 or the navigation services server 410 in FIG. 9 may be combined with the functions of the keyword maintenance program (230 in FIG. 2). For example, a map engine in the navigation services server 410 can also be used when defining a keyword, including the function of associating a keyword with a map location. According to this embodiment, the navigation services server 410 presents a user with a map image that includes the location to be associated with a keyword. Then, the user enters the keyword name and clicks on a location on the map image to be associated with the keyword. The map engine in the navigation services server 410 then stores the keyword, the geographic database vendor/map version, and map location in a keyword database (similar to the keyword database 436 in FIG. 9). Alternatively, the map engine in the navigation services server 410 sends the keyword, the geographic database vendor/map version, and map location to the keyword server 440 in FIG. 9 or the keyword maintenance program 230 in FIG. 2 requesting to add the keyword to the keyword database 236.

B. Client Side Applications

Figure 10:
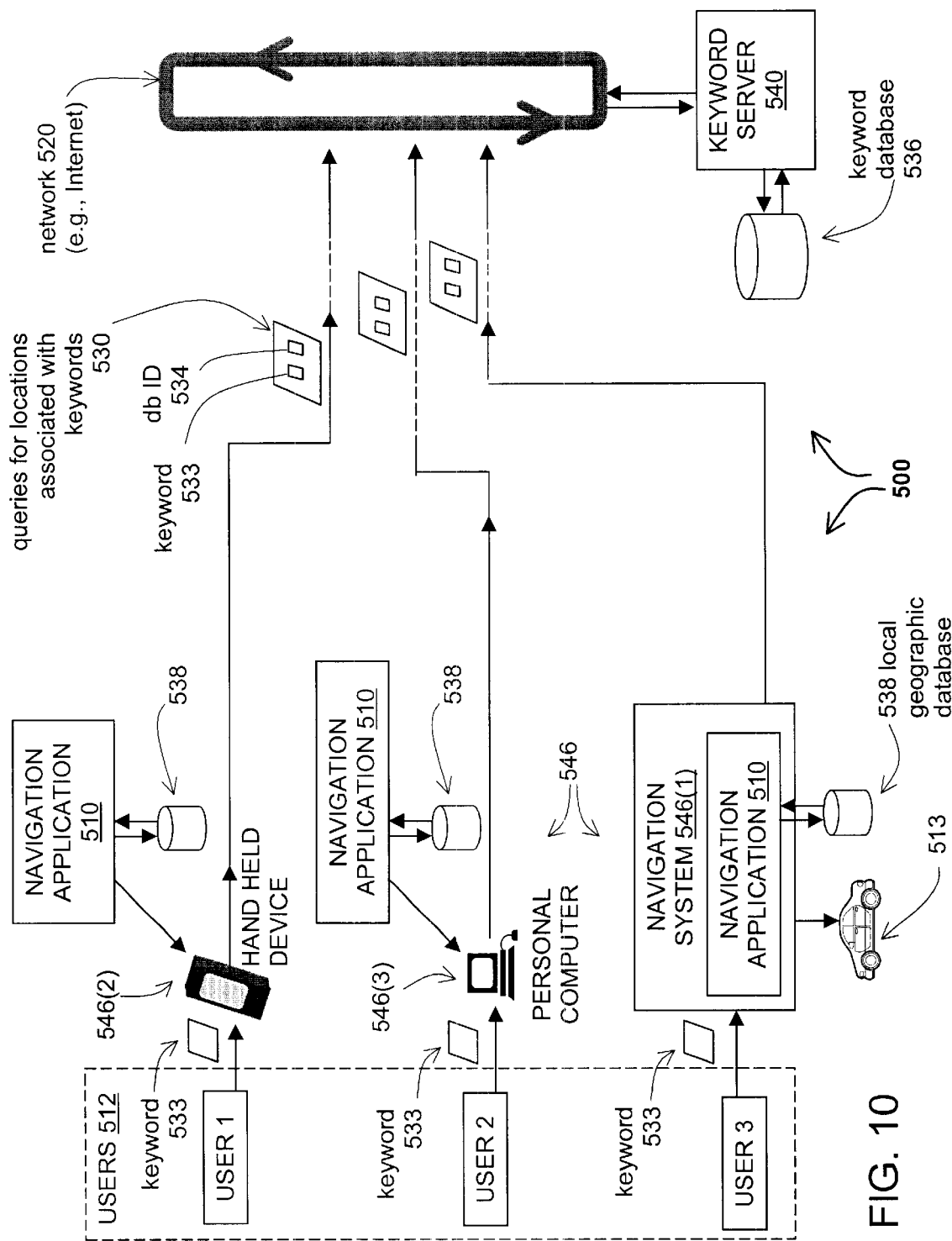
FIG. 10 is a block diagram of another embodiment of a system that provides navigation- or map-related features and that accepts keywords for the specification of physical locations when accepting requests for such navigation- or map-related features.

FIG. 10 shows another embodiment 500 of a system for using keywords to obtain navigation- or map-related services. (The keywords used in the embodiments of FIG. 10 have been registered using the system described in connection with FIG. 2 or another system.) The system 500 in FIG. 10 is a client-server system. In FIG. 10, users 512 operate separate client systems 546. (The users 512 in FIG. 10 may include some of the same users 412 in FIG. 9.) The client systems 546 may include navigation systems 546(1) installed in vehicles 513, personal (hand-held) navigation systems 546(2), or general purpose devices, such as personal computers (including portable computers) 546(3), personal digital assistants, portable phones, etc.

In FIG. 10, the separate client systems 546 access a keyword server 540. The keyword server 540 is at a location remote from the client systems 546. The keyword server 540 is accessible to the client systems 546 over a network 520 which may include a wireless communications link, the Internet, and so on.

Each of the client systems 546 in FIG. 10 includes hardware and software for performing navigation- or map-related functions for the users 512. For example, in the embodiment of FIG. 10, the software for performing navigation- or map-related functions includes navigation-related applications 510, which are located or installed on the separate client systems 546. The navigation applications 510 in the separate client systems 546 provide one or more navigation-related features to the users 512 upon request. The navigation-related features may include route calculation, route guidance, electronic yellow pages, map display or other navigation- or map-related services.

In the embodiment of FIG. 10, each user 512 operates a user interface of a corresponding one of the client systems 546 to obtain navigation- or map-related services. When operating each of the client systems 546, each user 512 uses a keyword 533 to designate a physical location in connection with the request for navigation- or map-related services. The keyword 533 may be used to specify a destination, a starting point, a map location, etc. In this embodiment, each client system 546 includes appropriate programming that receives the input from the corresponding user 512, extracts the keyword, and sends a query 530 to the keyword server 540 that includes the keyword 533.

When any of the client systems 546 sends a query 530 to the keyword server 540 for the location data associated with a keyword, the query 530 may include the keyword 533 and data 534 identifying the geographic database 538, which is stored locally with and used by the client system 546. The data 534 identifying the local geographic database may include the following information, if available: the geographic database vendor, the geographic database type, the name of the geographic database, the version of the geographic database, and the release of the geographic database. The data identifying the local geographic database used by the navigation system may be necessary so that the map location information returned from the remote keyword server 540 is referenced to the correct map version, release, vendor, etc.

The keyword server 540 receives the queries 530 from each of the client systems 546. The keyword server 540 accesses a keyword database 536, which is associated therewith, to obtain the map location data (300(5) in FIG. 7) associated with the keyword 533. (The keyword database 536 may be the same as the keyword database 236 in FIG. 2 or the keyword database 436 in FIG. 9 or may be a copy thereof or include some or all of the same data.) If the request 530 to the keyword server 540 included data 534 identifying a particular geographic database, version, etc., the map location data that are returned are referenced to the specified geographic database.

When the client system 546 receives the geographic database location reference data 300(5)(6) from the keyword server 540, the client system 546 uses the geographic database location reference data 300(5)(6) in an appropriate navigation application 510 to provide the navigation- or map-related service requested by the user 512. Each of the client systems 546 may include or be associated with a copy 538 of a geographic database that can be accessed and used for these purposes. The copy 538 of a geographic database may be a copy of the geographic database 238 in FIG. 2 or a copy of the geographic database 438 in FIG. 9 or may include some or all of the same data. After using the geographic database location reference data 300(5)(6) in an appropriate navigation application 510, the client system 546 provides the requested navigation- or map-related service to the user 512.

As stated in connection with the previous embodiment, the keyword database 536 associated with the keyword server 540 may not necessarily have geographic database location reference data associated with all the keywords stored therein and therefore, the keyword server 540 may not be able to return geographic database location reference data 300(5)(6) associated with a particular keyword included in a query from any of the client systems 546. If the keyword server 540 does not have geographic database location reference data 300(5)(6) associated with a particular keyword identified in a query, the keyword server 540 forwards other data associated with the keyword. If the keyword server 540 finds that the keyword database does not have geographic database location reference data 300(5)(6) associated with a particular keyword identified in a query, but that the keyword database has street address data 300(6) and latitude and longitude data 300(7) associated with the particular keyword, the keyword server 540 returns the street address data 300(6) and latitude and longitude data 300(7). When the navigation applications 510 in any of the client systems 546 receives street address data 300(6) and latitude and longitude data 300(7) instead of geographic database location reference data 300(5)(6) from the keyword server 540, the navigation application 510 uses the street address data 300(6) in an application (e.g., a geo-coding application) to obtain a map-referenced position (i.e., a position referenced in terms of data in the geographic database 538) which in turn is used by the navigation application 510 to provide the requested navigation- or map-related service, as described above. When the navigation application 510 geo-codes street address data 300(6) to obtain a map-referenced position, the latitude and longitude coordinate data 300(7) may be used to determine whether the map-referenced position obtained by geo-coding the street address data is reliable. If the geo-coding of the street address data is not reliable, the map-referenced position determined by geo-coding the latitude and longitude data 300(7) is used by the navigation application 510 to provide the requested navigation- or map-related service.

Referring back to a prior step, if the keyword server finds 540 that the keyword database 536 does not have either geographic database location reference data 300(5)(6) or street address data 300(6) associated a particular keyword contained in a request 530 from any of the client systems 546, the keyword server 540 returns the latitude and longitude coordinate data 300(7), if available, to the client system. The latitude and longitude data 300(7) are geo-coded, as described above, to obtain a map-referenced position which is then used by the navigation application 510 to provide the requested navigation- or map-related service.

In FIG. 10, the navigation-related applications 510 and the keyword server 540 perform the functions of the keyword-enabled application 114 in FIG. 1.

In the embodiment of FIG. 10, the keyword server 540 may support queries from navigation services servers (like the navigation services server 410 in FIG. 9) as well as queries from separate client systems 546.

In the embodiment of FIG. 10, each separate client system 546 is shown as having a separate geographic database 538 stored locally therewith. In alternative embodiments, the geographic database 538 used in any of the separate client systems 546 may be stored remotely from the client system 546 and accessed via a communications link, such as the network 520.

C. Standalone Systems

Figure 11:
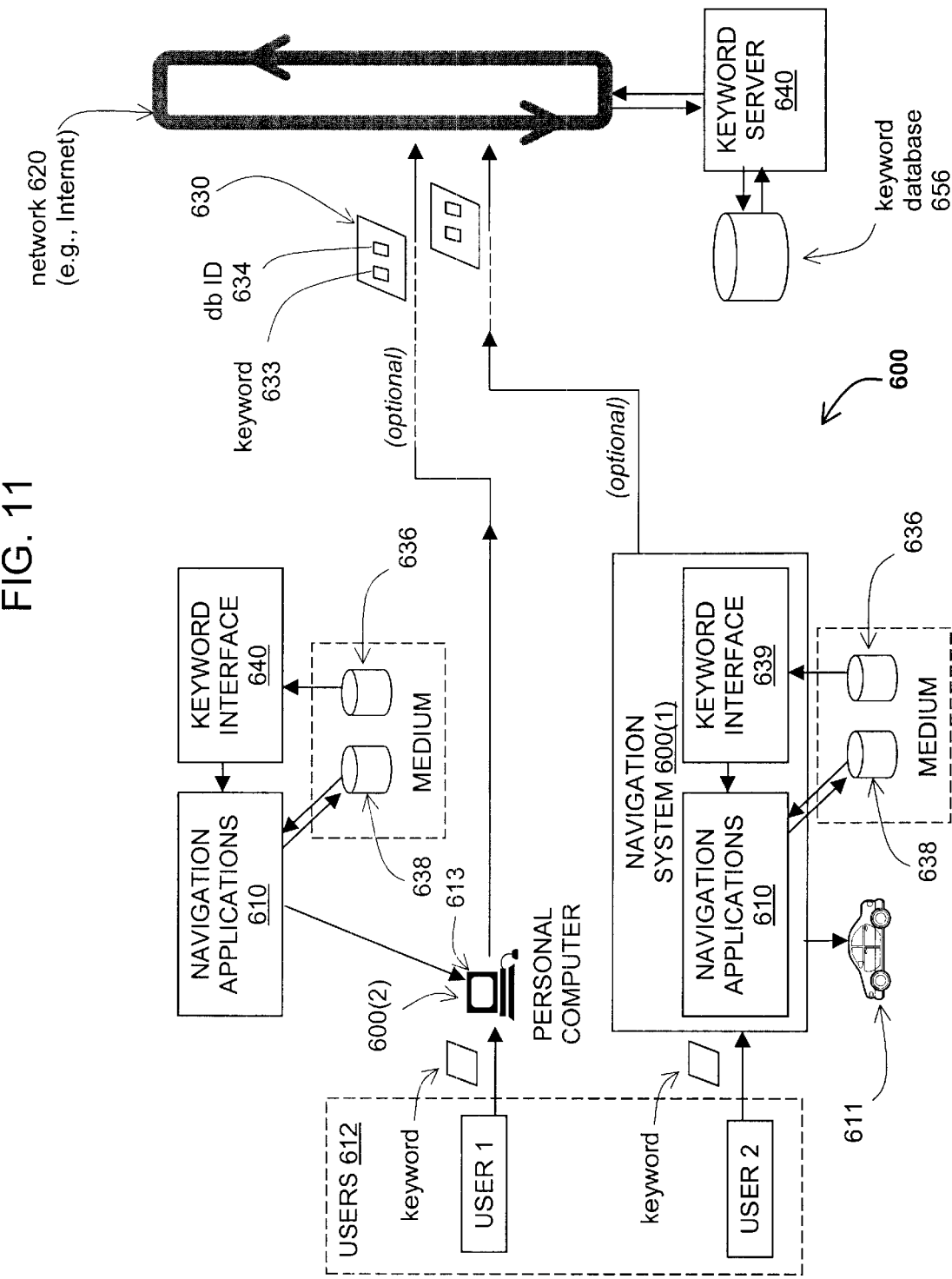
FIG. 11 is a block diagram of yet another embodiment of a system that provides navigation- or map-related features and that accepts keywords for the specification of physical locations when accepting requests for such navigation- or map-related features.

FIG. 11 shows additional embodiments of systems that use keywords to provide navigation- or map-related services. The systems in FIG. 11 include standalone systems 600. The standalone systems 600 of FIG. 11 include a standalone navigation system 600(1) installed in a vehicle 611 and a standalone general purpose computing system 600(2), such as a personal computer 613. Alternatively, the standalone systems 600 may include navigation systems that are not installed in vehicles (e.g., personal navigation systems), personal digital assistants, or other types of computing devices. In the embodiments of FIG. 11, each of the standalone systems 600 includes one or more navigation-related applications 610.

In FIG. 11, each standalone system 600 includes or uses a geographic database 638. (The geographic database 638 in each system 600 may be similar or identical to the geographic database 138 in FIG. 1, 238 in FIG. 2, 438 in FIG. 9, or 538 in FIG. 10, or may contain some or all of the same data.) The copies of the geographic database 638 are stored locally with the systems 600. The copy of the geographic database 638 may be stored on a fixed or hard disk, a CD-ROM disk, a DVD disk, or any other type of media. The navigation-related applications 610 on each of the standalone systems 600 use the data stored in the copies of the geographic database 638 stored locally.

In the embodiment of FIG. 11, each standalone system 600 includes a copy of a keyword database 636 associated therewith. The copy of the keyword database 636 in FIG. 11 may be a copy of the keyword database 136 in FIG. 1, 236 in FIG. 2, 436 in FIG. 9, or 536 in FIG. 10, or may contain some or all of the same data. The copy of the keyword database 636 which is stored locally with each of the standalone systems 600 may include all the keywords contained in the keyword database 236 in FIG. 2, or alternatively, the copy of the keyword database 636 may include only a portion of all the keywords contained in the keyword database 236 (or 436 or 536). The copy of the keyword database 636 may be separate from the copy of the geographic database 638 or may be included or bundled with the copy of the geographic database 638. The copy of the keyword database 636 may be distributed with the copy of the geographic database 638 or downloaded from a server.

In the embodiment of FIG. 11, a user 612 requests navigation-related services from one of the standalone systems 600. (The users 612 in FIG. 11 may include some of the same users 412 in FIG. 9 or users 512 in FIG. 10.) When requesting navigation-related services, the user 612 uses a keyword to specify a location.

In the embodiment of FIG. 11, each standalone system 600 includes a keyword interface application 639. The keyword interface application 639 is capable of receiving queries from the navigation-related applications 610 for keyword information, access the copy of the keyword database 636, and return the requested information to the navigation-related application 610 in response to the query.

The keyword database 636 in FIG. 11 is used in a similar way as the keyword database described in FIG. 9 or 10. When the user 612 uses a keyword to specify a physical location, the navigation application 610 on the system 600 extracts the keyword from the user's input and queries the keyword interface application 639. The keyword interface application 639 accesses the locally available copy of the keyword database 636 to obtain the map location data (300(5) in FIG. 7) associated with the keyword. The map location data associated with a keyword are included in the copy of the keyword database 636 that is located locally with each of the standalone systems 600 in FIG. 11. One of the advantages of the embodiments of FIG. 11 is that the keywords are stored locally and therefore are readily available. The keyword interface application 639 then returns the map location data (300(5) in FIG. 7) to the requesting navigation application 610.

According to one alternative, any of the standalone systems 600 in FIG. 11 may include some of the features of any the systems in FIG. 9 or FIG. 10. For example, with any of the standalone systems 600 of FIG. 11, if the keyword that is input by a user into the user interface of the standalone system 600 to specify a location in a request for navigation- or map-related services is not contained in the copy of the keyword database 636 stored locally with the standalone system 600, a query 630 is sent from the keyword interface application 639 in the standalone system 600 to a remote keyword server 640 via a communications link 620. The communications link 620 may be a land-based communications system or a wireless system, such as a cell phone-based system. The communications link 620 may use the Internet to transmit the request to the remote keyword server 640.

The query 630 may include both the keyword 633 and data 634 identifying the geographic database 638 which is stored locally with the standalone system 600. The data 634 identifying the geographic database may include the following information, if available: the geographic database vendor, the geographic database type, the name of the geographic database, the version of the geographic database, and the release of the geographic database. The data 634 identifying the geographic database used by the standalone system 600 may be necessary so that the map location information returned from the remote keyword server 640 is referenced to the correct map version, release, vendor, etc.

The remote keyword server 640 may be similar or identical to the keyword server 440 in FIG. 9. The remote keyword server 640 is associated with another copy of a keyword database 656. The keyword database 656 in FIG. 11 may be a copy of the keyword database 236 in FIG. 2, 436 in FIG. 9, or 536 in FIG. 10, or may contain some or all of the same data. In response to the query 630 from the standalone system 600, the remote keyword server 640 sends a reply containing the map location data, in a similar manner as described above in connection with FIG. 9 or 10.

As in the previous embodiments, if the remote keyword server 640 does not have geographic database location reference data associated with a keyword contained in a query from a standalone system 600, the keyword server 640 returns the street address data 300(6) and latitude and longitude data 300(7) associated with the keyword, if available. If the standalone system 600 receives street address data and the latitude and longitude coordinate data instead of geographic database location reference data from the remote keyword server 640, the standalone system 600 geo-codes the street address data to obtain a map-referenced position which in turn is used by the navigation application 610 in the standalone system 600 to provide the requested navigation- or map-related service. The latitude and longitude coordinate data returned from the remote keyword server 640 may be used to determine whether the map-referenced position obtained by geo-coding the street address data is reliable, as explained above. If the geo-coding of the street address data is determined to be not reliable, the map-referenced position determined by geo-coding the latitude and longitude data 300(7) is used by the navigation application 610 to provide the requested navigation- or map-related service.

Referring back to a prior step, if the remote keyword server finds 640 that the keyword database 656 does not have either geographic database location reference data or street address data associated a particular keyword contained in a query 630 from any of the standalone systems 600, the remote keyword server 640 returns the latitude and longitude coordinate data, if available, to the standalone system. The latitude and longitude data 300(7) are geo-coded, as described above, to obtain a map-referenced position which is then used by the navigation application 610 to provide the requested navigation- or map-related service.

(In FIG. 11, the navigation-related applications 610 and the keyword interface application 639 perform the functions of the keyword-enabled application 114 in FIG. 1.)

IV. Keyword Search Engine

In the foregoing sections, it was described how keywords could be used on various computing platforms and in various computer architectures to specify a location when using an application that provided navigation-related or map-related services.

Figure 12:
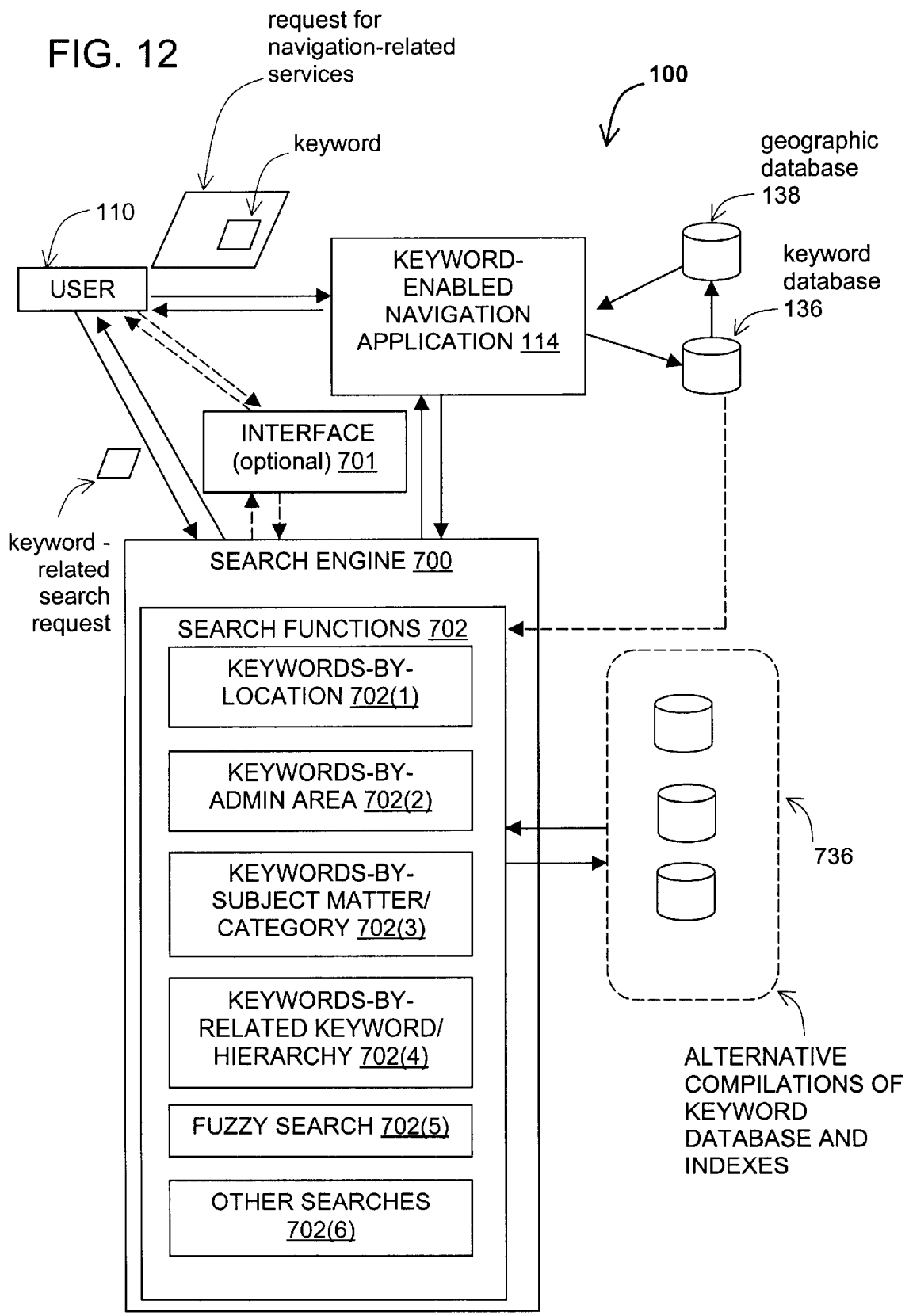
FIG. 12 is a block diagram of an embodiment of a keyword search engine system.

To facilitate the use of keywords, various keyword-related search capabilities are provided. According to one embodiment, keyword search capabilities are provided by a keyword search engine. FIG. 12 shows components of one embodiment of a keyword search engine 700. In FIG. 12, the keyword search engine 700 is shown in relation to the navigation-enabled application 114 described in connection with FIG. 1. The keyword search engine 700 is installed on a computing platform, which may be any of the computing platforms described in connection with FIGS. 9–11. For example, the keyword search engine 700 may be installed on a server platform, a client platform or on a standalone platform. In one embodiment, the keyword search engine 700 is part of the keyword server (440 in FIG. 9 or 540 in FIG. 10). Alternatively, the keyword search engine 700 may be installed on the same computing platform as the keyword-enabled navigation application 114 or may be installed on another platform. The keyword search engine 700 may also be provided on the same platform as the keyword service provider (220 in FIG. 2) or co-located with the keyword service provider.

The keyword search engine 700 is accessible to the users 110. The users 110 may access the keyword search engine 700 over a network (e.g., the Internet) if the keyword search engine 700 is located on a server. Alternatively, the users 110 may access the keyword search engine 700 locally if the keyword search engine 700 is located on a client platform or a standalone platform.

If the keyword search engine 700 is located on a remote platform, the user 110 may access the keyword search engine 700 using a search engine interface program 701. The search engine interface program 701 provides a means by which the user can access the keyword search engine 700 located at a remote location. The search engine interface program 701 may be any type of program by which information can be exchanged with the keyword search engine 700. For example, the search engine interface program 701 may be implemented in an Internet browser.

The keyword search engine 700 provides one or more keyword-related search capabilities or functions 702. These keyword-related search capabilities or functions 702 include the following:

(1). Keyword-by-location. The keyword search engine 700 includes a search function 702(1) by which keywords can be found based upon their associated locations. As an example, with this function 702(1), a user 110 can obtain all registered keywords (or some defined portion thereof) that have associated locations (i.e., 300(5)(6) in FIG. 7) within a given area. The user can specify the given area by radius, e.g., all registered keywords for locations within a given distance from a specified location. The specified location can be indicated by (1) data contained in a geographic database, (2) street address, or (3) geographic coordinates. Alternatively, the given area may be specified by a bounding rectangle (e.g., within latitude-longitude coordinates). As a further example, with this function 702(1), a user 110 can obtain all registered keywords that are associated with a specific location. According to another example, this function 702(1) allows a user 110 to obtain the registered keyword that has an associated location closest to a specified location. (The specified location may be indicated by any of the ways previously stated.) According to still another example, this function 702(1) allows a user 110 to obtain all the registered keywords located along a road represented by data in the geographic database where the road is indicated by any of the ways previously mentioned for indicating locations. According to one exemplary use of the function 702(1), a user 110 sends geographic coordinates obtained by a GPS receiver in an in-vehicle navigation system (or cell phone) with a request for keywords located within 1 mile of the geographic coordinates. The keyword search engine 700 returns all the keywords that have associated locations within 1 mile of the indicated geographic coordinates to the user (or the user's navigation system or cell phone.)

(2). Keyword-by-administrative area. The keyword search engine 700 includes a search function 702(2) by which keywords can be found based upon the administrative areas in which their associated locations are located. Administrative areas include municipalities (e.g., cities, towns, states, countries, counties, provinces, neighborhoods, districts, and so on). As an example, with this function 702(2), a user 110 can obtain all registered keywords (or some defined portion thereof) that have associated locations (i.e., 300(5)(6) in FIG. 7) within a given city. The user can specify the given administrative area by name, e.g., "all registered keywords for locations within Chicago."

(3). Keyword-by-subject matter category. The keyword search engine 700 includes a search function 702(3) by which keywords can be found based upon their subject matter categories. The keyword subject matter categories were described above in connection with FIG. 8. As an example, with this function 702(3), a user 110 can obtain all registered keywords (or some defined portion thereof) that have a given subject matter category (i.e., 302(14) in FIG. 8). The user can specify the given subject matter category by name, e.g., "hotels", "restaurant", "gas stations", etc. The user can also access the keywords by subject matter hierarchies. Given a specified subject matter category, all keywords (or a defined portion thereof) having the specified subject matter category associated therewith are returned.

(4). Keyword-by-related keyword. The keyword search engine 700 includes a search function 702(4) by which keywords can be found based upon their related keywords. As mentioned above, keywords may be related to each other in a hierarchy with defined relationships, e.g., parent-child. For example, with this function 702(4), all the related children keywords defined for a given keyword are returned. Alternatively, all the related parent keywords defined for a given keyword are returned.

(5). Fuzzy searches. The keyword search engine 700 includes a fuzzy search function 702(5) by which keywords can be found based upon incomplete information. For example, given a few characters, all the keywords that have the given characters as their first characters are returned. The fuzzy search function 702(5) can use wildcard characters in keyword searches. The fuzzy search function 702(5) may also include a soundex function that returns keywords that sound like a given character string.

The various search functions 702 may be combined with logical operations. For example, the keyword-by-location search function 702(1) may be combined with the keyword-by-category search function 702(3) to return all the keywords that relate to a given subject matter category and that are within a given distance of a specified location. According to another example, a user (or the user's system) can be provided with all keywords in proximity to another keyword's location. According to this example, a query for all keywords in proximity of keyword "HILTON235" may return keywords "BURGER_KING67", "AMOCO2465", and "ROYAL_TOUCH_CARWASH." (Note that keywords may include phrases so that the underscores in these keywords may be replaced with blanks.)

In order to facilitate performing some or all these search functions, special compilations of the keyword database 736 may be prepared. For example, a spatially-organized version of the keyword database would organize all the keywords by their locations to facilitate spatial searches, such as the keyword-by-location search function 702(1). Similarly, an administrative-area-organized version of the keyword database would organize all the keywords by administrative area to facilitate keyword-by-administrative area searches.

Instead of preparing special compilations of the keyword database, the keyword database may be indexed. Alternatively, the keyword database 136 may be used directly by the keyword search engine 700.

Any of the functions of the keyword search engine 700 may also be accessed by the navigation-enabled keyword application 114 instead of by the user 114.

The results provided by any of the keyword search functions 702 of the keyword search engine 700 may be provided to the keyword-enabled navigation application 114. The keyword-enabled navigation application 114 may use the results from any of the functions of the keyword search engine 700 in an application that provides navigation- or map-related functions and return the results of the navigation- or map-related functions to the user V. Alternative Embodiments and Features A. Defining Local Keywords Ways to register keywords were described above in connection with FIG. 2. Another way to register a keyword is to use a device or system that can determine its own physical location. A device or system that can determine its own physical location includes positioning system technology, such as GPS, inertial sensors, etc. Such systems include the navigation systems 446(4), 546(1), and 600(1), shown in FIGS. 9, 10, and 11, respectively. Positioning system technology may be included in other types of systems and devices, including GPS-equipped cellular phones, personal digital organizers, etc.

In order to register a keyword using any of these types of systems or devices, the user enters a keyword name using the user interface of the device or system. Then, the user indicates that the keyword should be associated with the current (or last reported) physical (e.g., GPS) location of the device or system. The device or system may relate (i.e., geocode) the current physical position to a geographic database, if available either locally or remotely. The device or system then saves the keyword and data indicating the associated physical location (or map position) in a local database. A keyword formed in this manner is local to the device or system. It can be used by the device or system in the same manner as any of the keywords described above.

B. Defining Keywords Using Positioning Systems

According to another alternative embodiment, devices and systems that include positioning system technology can also be used to register a keyword with a remote keyword service provider (220 in FIG. 2). The user operates a device or system (such as a navigation system or cellular phone) that has positioning system technology (such as GPS or inertial sensors). The user operates a local component of a keyword registration program that allows the user to store a current (e.g., GPS) position and then send a request to the remote keyword service provider to register a keyword with the stored current position. The request includes the keyword name and the current position. (The request may also include the altitude of the current position and time that the current position was obtained.) If the user's device or system include a geo-coding application, the user may send a geographic database-referenced location instead of (or in addition to) sending the GPS coordinates. The user may also send data indicating the street address. The street address of the location associated with a keyword can be entered directly by the user or the device or system can interpolate the street address from the geographic database location or GPS coordinates.

The remote keyword service provider receives the request from the device or system and proceeds to register the keyword in its own keyword database. The keyword service provider performs the function, described above, of checking to see whether the keyword has already been taken. If the keyword is available, the keyword service provider registers the keyword by storing data indicating the keyword and associated location in the keyword database (e.g., 236 in FIG. 2). If the request to register a keyword included geographic coordinates or a street address instead of a navigable-database referenced location, the keyword service provider may determine the geographic database referenced location corresponding to the geographic coordinates or street address and store data indicating the geographic database referenced location with the keyword.

EXAMPLE

This example demonstrates how a keyword can be used with a device that has position-determining capability. In this example, a user has a cell phone that includes positioning hardware and software, such as a GPS system, that allows the cell phone user to know the user's geographical position, i.e., latitude and longitude coordinates. The user wishes to associate his or her current location as the keyword "BOB_LUNCH." The user enters the text "BOB_LUNCH" into his or her cell phone using the cell phone's keypad. The user then invokes a function on the cell phone to register the keyword. The cell phone sends data indicating the current GPS coordinates (optionally, including altitude and the time the coordinates were obtained) wirelessly to a remote keyword service provider along with the keyword. In this scenario, the cell phone does not have a local geographic database and therefore the remote keyword server saves the keyword and coordinates in its keyword database.

Friends of the user operate a keyword-enabled navigation application on a system, such as the system in FIG. 9 or FIG. 10, to obtain driving directions to the lunch location. The user's friends enter "BOB_LUNCH" as the desired destination. The keyword-enabled navigation application accesses the keyword server with a query for the map-specific location associated with the keyword "BOB_LUNCH."

C. Commercial and Non-commercial Keywords

According to the embodiment of the keyword registration process described above in connection with FIG. 2, keywords can be registered by individuals, businesses, government agencies, etc. According to one embodiment, the keyword service provider does not charge for registering keywords. In an alternative embodiment, the keyword service provider charges fees for registering keywords. In still another embodiment, the keyword service provider charges a fee for some kinds of keyword registrations but registers other keywords for free.

According to one alternative embodiment, a keyword service provider charges a fee for maintaining a keyword for a period of time. For example, a fee of $50 may be charged for maintaining the keyword for a period of two years. (This is similar to the paid registration that reserves the usage of an Internet domain name for a period of time.) By contrast, the keyword service provider may allow a person to register a keyword for a short period of time, e.g., one month, for free.

Fees can also be charged for additional keyword features. For example, the keyword service provider may register a single keyword for a location for no charge, but may charge a fee if the keyword registration includes related keywords, as described above. Alternatively, the keyword service provider may register a randomly-generated keyword for no charge, but may charge a fee if the person registering the keyword selects the keyword.

D. Keywords Registered by Geographic Database Providers

In the embodiments described above, keywords were registered by persons, such as businesses and individuals. According to another embodiment, the provider of the geographic database (138 in FIG. 1) may register and maintain keywords for places of general interest that are included in the geographic database. Such places of general interest include airports, national tourist attractions, etc. Keywords for these kinds of places may be registered by the geographic database provider because of the widespread interest for routing to these locations.

E. Initial Keyword Database Creation

One way that the keyword database can be initially developed is to use the phone number of a location as its initial keyword. According to this embodiment, phone number listings that include associated addresses are obtained from commercially available sources, such as the white pages, the yellow pages, or on-line versions of the white or yellow pages. Then, an initial version of the keyword database is built using the phone number of a location as its keyword and the address associated with the phone number as the associated location of the keyword. Using a geographic database and a geo-coding application (like the geo-coding application described above connection with navigation systems), a map-specific location can be determined for each address associated with a phone-number-derived keyword. This map-specific location is then stored in the keyword database record that has the phone number as its keyword. Building a keyword database in this manner may not provide the best map-specific location for a keyword. Accordingly, users may use the keyword registration system described in FIG. 2 to modify the map-specific locations associated with keywords, change the keywords, update the information associated with keywords, and so on, as described above.

F. Chat Rooms

Another way to build the keyword database is through on-line chat rooms forums. On-line chart room forums provide a way for users to share information about particular subjects. A chat room forum can be organized to exchange information about locations that can be accessed by car. Chat room participants can identify locations about which they want to share information by registering keywords associated with the locations and then sharing the keywords in the on-line chat rooms. As an example, a chat room participant can register keywords for his or her favorite scenic locations and then share these keywords with others in a chat room forum directed to this subject matter. Another example relates to favorite truck stops. A chat room participant can register keywords for the locations of his or her favorite truck stops and then share these keywords with others in a chat room forum directed to truck stops.

G. Providing Counts of Keyword Hits

An additional feature that the keyword server can provide is a count of the number of times a keyword is used, by whom the keyword is used, and from where the keyword is used. The keyword server may charge the keyword owner for this service. This information could be of value to a keyword owner. For example, the keyword owner can check whether all the persons to whom a keyword was provided already accessed the keyword server to get directions. The keyword owner might also be interested to know who is using the information.

H. Keyword Support for Voice Input

The keyword server may accept requests from users using voice commands. For example, a user may speak the keyword when accessing the keyword server to obtain navigation- or map-related services. The keyword server includes voice recognition software that enables accepting voice input from the user.

I. Off-road Locations

In embodiments described above, a user associates a keyword with a location defined with respect to a geographic database and then can use the keyword to specify the location when using a keyword-enabled application that provides navigation- or map-related functions. According to an alternative embodiment, a keyword may be registered for a location that is not defined with respect to roads represented by data in a geographic database. According to this alternative, a keyword may be registered for an off-road location. Off-road locations include locations accessible by foot, such as interiors of buildings or shopping malls. Off-road locations may also include locations that are actually "off-road", e.g., in a field, on a beach, in a forest, and so on. Off-road locations may also include locations along roads that are not represented by data in a geographic database, e.g., new roads, private roads, etc. When registering a keyword for an off-road location, the keyword may be associated with data indicating the geographic coordinates of the off-road location.

When registering a keyword for an off-road location, special access instructions may be included in a data field associated with the keyword. The special access instructions may indicate that the location associated with the keyword is not accessible by vehicle by road but may be accessible by other means, such as by foot, by 4-wheel drive vehicle, etc. A keyword for an off-road location may reference another keyword that is associated with a nearby location which is accessible by vehicle. As an example, a keyword defined for the location of a store in a shopping mall may reference another keyword associated with the location of the parking lot of the shopping mall. The keyword associated with the location of the store in a shopping mall may include special access instructions that indicate how to walk from the location of the parking lot to the store. If the person has a hand-held navigation system that includes a GPS system, a navigation application in the hand-held navigation system may be used to guide the person by foot from the parking lot to the geographic coordinates associated with the keyword associated with the store in the shopping mall.

J. Using Keywords in Business Advertising

Businesses can use their keywords in their ads. For example, a restaurant could mention its keyword in its radio ad. A customer user would be able to use a navigation application to obtain route guidance to the restaurant by entering the keyword as a destination.

K. Cell Phone Applications

As mentioned above in connection with the systems shown in FIG. 9, cell phone users can obtain navigation- or map-related information from navigation services providers, such as the navigation services server 410. Cell phone users may use the cell phone keypad for input and the display screen of the cell phone for text or graphics output. For example, cell phones that have text display can be used to query for a keyword street address, e.g., "Show me the street address and phone number for HILTON123" where "HILTON123" is a keyword.

In another alternative, cell phone users may request and obtain navigation- and map-related services audibly using voice recognition and speech synthesis software or with the assistance of a human operator. For example, cell phone users may enter a keyword vocally as a destination for a routing service. The navigation services provider may provide routing directions to the cell phone user audibly (either by speech synthesis or by human speech).

L. Late Binding of Keywords and Locations

In embodiments described above, a user registers a keyword by accessing a keyword service provider, selecting a keyword, and associating the keyword with a location defined with respect to a geographic database whereupon the keyword service provider stores the keyword and data associating the keyword with the location. The associating step may be regarded as a binding of the keyword to the location. In an alternative embodiment, the binding of a keyword to a location may be not necessarily be performed at the same time as the selection of the keyword. As an example, a registering user can access the keyword service provide and select a keyword but not associate it with a location at that time of selection. Then, the keyword service provider reserves the keyword for the registering user so that no one else can register it. At a later time, the user can access the service provider and then associate a location defined with respect to a geographic database with the previously reserved keyword.

Entire classes of keywords can be registered this way. For example, a police reporting system for accident reports can reserve a class of keywords "PATROL__001", "PATROL__002", etc. These keywords are not associated at the time of registration but are reserved. Then, when a police patrol responds to accident reports, the location of each accident is associated with one of the reserved keywords. A navigation system or GPS system in the police officer's vehicle may be used to automatically send the accident location to the keyword service provider so that the location can automatically be associated with the next available reserved keyword. Indicating locations in this manner has numerous advantages compared to prior methods in which the police office physically wrote down accident locations.

M. Alternative Features in Keyword Database

(1). Cross Listing of Keywords

Figure 13:
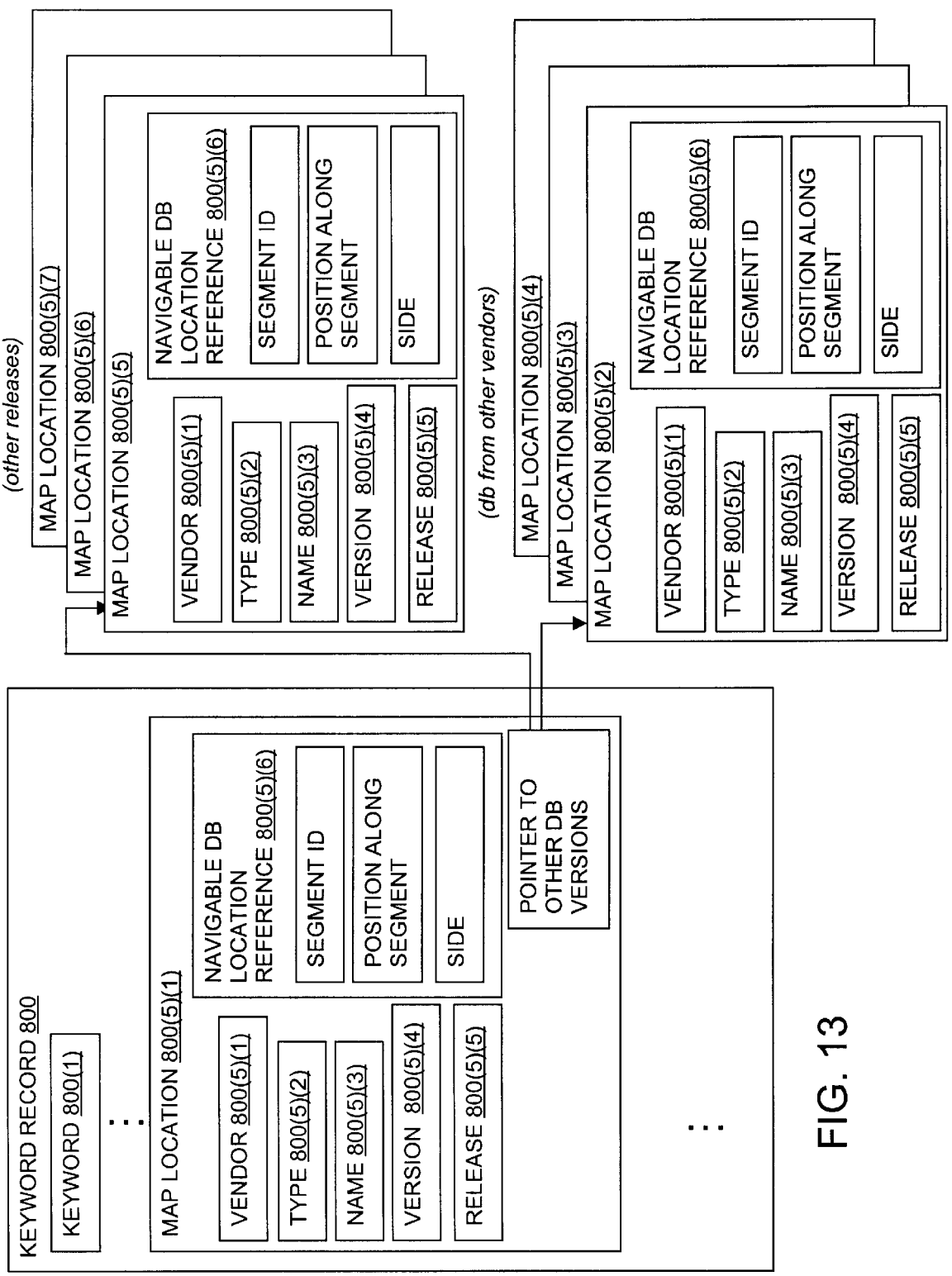
FIG. 13 is a block diagram showing components of an alternative embodiment of the keyword data record shown in FIG. 6.

In the embodiment of the keyword registration system described in connection FIG. 2, it was stated that the keyword record (300 shown in FIG. 7) contains data identifying a map location including a geographic database vendor, a geographic database type, a geographic database name, a geographic database version, a geographic database release, and a map-specific location. In one embodiment, a keyword is associated with a map-specific location defined in terms of a geographic database of a single release version from a single geographic database vendor. In alternative embodiments, a keyword may be associated with a map location defined in terms of multiple geographic database vendors, multiple geographic database types, multiple geographic database names, multiple geographic database versions, and multiple geographic database releases. If a keyword is associated with a map location defined in terms of multiple geographic database vendors, multiple geographic database types, and so on, the map specific location data would be usable by persons who have navigation systems that use such other geographic databases. According to this alternative embodiment, the keyword database includes a means by which a single keyword may be registered with a map location defined in terms of plural geographic databases. These plural geographic databases may be from different vendors or different releases of geographic databases from the same vendor. The keyword service provider 220 in FIG. 2 may offer to cross-list the keyword location associated with a keyword across multiple geographic databases. The keyword service provider 220 may charge a fee for cross-listing a keyword with a map location defined in terms of multiple geographic database vendors, multiple geographic database releases, etc. FIG. 13 is a block diagram that shows an alternative embodiment of a keyword data record 800 that provides support for including data that identifies multiple geographic database vendors or multiple geographic database releases associated with a single keyword.

(2). User-added Instructions

In another embodiment, users who register keywords can add additional instructions or comments to the keyword records. These additional instructions or comments may include special instructions that would facilitate routing to the location associated with the keyword. For example, a user may include special instructions that state "WATCH FOR DRIVEWAY NEXT TO THE RED SILO"; "DOG DOES NOT BITE"; or "KEY IS UNDER THE CARPET." These special instructions would be accessed whenever the keyword is accessed. Thus, a person using the keyword as a routing destination in a navigation application would be provided with the special instructions along with the map-specific location data. These special instruction may include the floor to go to, the distance from street, the visibility from the street, a picture of the location, or anything that might help the person using the keyword to travel the last few meters, e.g., 100 meters, to the destination. User-provided instructions can also be used to specify hours of delivery, e.g., "ALL DELIVERIES AFTER 5 PM TO SIDE DOOR."

(3). User-added Multi-media

In another embodiment, users who register keywords can associate multi-media data with the keyword. For example, users who register keywords can associate audio data with the keyword. The audio data can be spoken information about the location, instructions about how to reach to location, or any other type of audio. The audio data can be played back on the user's computing platform when the keyword is accessed. Users can also associate video data with a keyword. The video data may include advertising commercials, clips from famous movies, etc.

When audio or video data are associated with a keyword, the audio or video data may be included in the keyword record in the keyword database (e.g., 236 in FIG. 2) or the keyword record may include a reference, pointer, link or hyperlink to another file or data storage area where the audio or video data are located.

(4). Use of Symbols and Icons

In another alternative, the keyword is associated with a symbol or icon. The symbol or icon can be used on map images rendered on the user's computing platform. The symbol or icon is shown on the map image and is used to represent the location. The icon may represent the facility or category (e.g., gas stations, hotels, McDonald's restaurants) of the keyword or may be user-defined. When the user moves a cursor over the symbol or icon, the keyword or other information about the location associated with the keyword appears. If the user clicks the icon, the user gets the keyword, the associated map referenced location, or both. The interface on the user's system allows the user to "drag" the icon to another icon that represents a route calculation application. Dragging the icon representing the location to the route calculation application causes the route calculation application to calculate a route to the location represented by the icon (using the keyword associated with the icon).

VI. Applications Using Related Keywords

Use of keywords and keyword-enabled applications provide navigation- or map-related services. Keyword-enabled applications can facilitate various logistical and scheduling applications, as demonstrated by the following:

A. Scheduling Real Estate Showings

When real estate properties are listed for sale, a keyword is registered for each property. Then, a prospective buyer browses on-line real estate listings and uses on-line search capabilities to identify several properties to visit. A keyword, e.g., "OAK_PARK_ON_051200", is defined and related to the keyword of each of the properties that the prospective buyer wishes to visit on a certain day in an certain area, e.g., May 12, 2000 in Oak Park. The keyword "OAK_PARK_ON_051200" acts as a container. The keyword "OAK_PARK_ON_051200" is sent to a route calculation application. The route calculation application can obtain the keywords for the properties that had been related to the "OAK_PARK_ON_051200" keyword. From the keywords for the properties, the route calculation application can obtain the locations of the properties and then calculate the most efficient route for visiting each of the properties. Routing instructions for following the calculated route is provided to the prospective buyer's navigation system, cell phone, etc.

B. Scheduling Deliveries with Multiple Drivers

Another application for keywords is to schedule deliveries. An example is a flower delivery service. In this example, a flower delivery service employs a dispatcher and several delivery drivers. The dispatcher registers keywords (on a keyword server) for each driver, e.g., "DRIVER1", "DRIVER2", etc. The dispatcher receives orders for flowers. The orders are received over a period of several hours. As the orders come in, the dispatcher registers a keyword (with the keyword service provider) for each location to which flowers are to be delivered, e.g., "ROSES1", "CUSTOM_BOUQUET2", "POTTED_PLANT3", etc. As the orders come in, the dispatcher also associates the keywords registered for each delivery location with the keyword registered for a driver. In this application, the keyword registered for the driver acts as a container. When a driver arrives on duty, the driver accesses the keyword server and requests the registered delivery location keywords that had been related to his or her own keyword. These registered delivery location keywords are sent to a route calculation application (either associated with the keyword server or in a navigation system in the driver's vehicle) to calculate an efficient route for the driver to follow to make the deliveries. The driver is then provided with driving instructions for following the calculated route.

C. Scheduling Deliveries with Time Constraints

Another scheduling application relates to catering. A catering service receives orders for different types of food to be delivered. Each order also specifies a time (e.g., 4:00 PM) for the delivery or a time range (between 11:30 AM and 12:30 PM). As the orders are received, a keyword is registered for each location to which food is to be delivered. Included with the keyword is the time or time range. As in the previous example, a keyword may be registered for each of a plurality of drivers. A dispatcher relates each of the delivery location keywords with a driver keyword. Then, each driver accesses the keyword server to obtain the registered delivery location keywords that had been related to his or her own keyword. These registered delivery location keywords are sent to a route calculation application (either associated with the keyword server or in a navigation system in the driver's vehicle) to calculate a route for the driver to follow to make the deliveries. The route calculation application takes into account the time constraints associated with each delivery location so that the orders are delivered within the specified times. The driver is then provided with driving instructions for following the calculated route and is also reminded about the specified times.

D. Scheduling Deliveries with Ordering Constraints

In the previous example, the scheduling application ordered the deliveries based upon a time or time range. According to an alternative embodiment, a route for making the deliveries may be based upon any kind of ordering. For example, the deliveries may be scheduled to be made in the order in which the catering requests were received. To implement this type of ordering, as the catering requests are received, a keyword is registered for each location to which food is to be delivered. As the keywords are registered, an ordering number is associated with each keyword. If the deliveries are to be made in the order in which the catering requests were received, the ordering numbers are assigned sequentially. (In alternative embodiments, the deliveries may be made in any other order and accordingly in such alternative embodiments the ordering number associated with each keyword is selected to define the desired delivery order.) As in the previous examples, keywords are registered for each of a plurality of drivers. Then, a dispatcher relates each of the delivery location keywords with a driver keyword. Each driver accesses the keyword server to obtain the registered delivery location keywords that had been related to his or her own keyword. These registered delivery location keywords for a driver are sent to a route calculation application (either associated with the keyword server or in a navigation system in the driver's vehicle) to calculate a route for the driver to follow to make the deliveries. The route calculation application calculates a route taking into account the ordering number associated with each delivery location so that the deliveries are made in the order defined by the ordering numbers, i.e., the order in which the catering requests were received. The driver is then provided with driving instructions for following the calculated route.

E. In-vehicle Navigation System with Internet Access

In this example, a user has a navigation system with Internet access in an automobile. The navigation system includes a keyword-enabled browser. The user finds a website of a vineyard to visit. The keyword is displayed on the website. The user highlights the keyword displayed on the website and instructs a browser in the navigation system to route to the location associated with the keyword. According to one embodiment, the browser passes the keyword to a keyword-enabled navigation application (e.g., 114 in FIG. 1) in the vehicle navigation system, which uses the keyword in the same manner as if the user entered the keyword manually, to provide navigation-related services, as in previously described embodiments. The keyword-enabled navigation application accesses a keyword database to obtain the location associated with the keyword. The keyword database may be stored locally in the vehicle or the keyword database may be stored with a remote keyword server, which is accessible over the Internet. When the keyword database has been accessed, the map location associated with the keyword is used by the vehicle navigation system as the destination in a route calculated by the navigation system.

F. Breadcrumbing

Another use for keywords and keyword-enabled applications is breadcrumbing. Breadcrumbing refers to providing a means for one person to follow another person's route. Breadcrumbing may be used for certain types of delivery routes, e.g., paper routes milk routes, etc. A regular driver may develop an efficient route over time. When a substitute driver is called upon to take over for the regular driver, it is beneficial if the substitute driver uses the same route as the regular driver. With a breadcrumbing application, routes can be saved easily. According to one embodiment, the regular driver registers keywords for locations along the route, e.g., "PAPERSTOP1" "PAPERSTOP2", etc. These keywords are then related to a driver keyword "DRIVER1." The driver keyword does not refer directly to any locations, but instead acts as a container for the keywords registered for locations along the route. When the regular driver is unavailable, the substitute driver accesses the keyword server and obtains all the keywords associated with the 'DRIVER1' keyword. The substitute driver then sends these keywords to a route guidance application. The route guidance application provides the substitute driver with instructions for following the regular driver's route in the order defined by the keywords that the regular driver registered for locations along the route.

Another way that breadcrumbing can be used is to provide a car theft recovery feature. According to this embodiment, the vehicle includes a positioning system and a breadcrumbing application. When a vehicle is stolen, the breadcrumbing application automatically registers keywords at regular intervals for the vehicle location. The keywords are related by a parent keyword "STOLENCAR." The stolen car can be recovered by sending the "STOLENCAR" keyword to a route calculation application to obtain a route to the location at which the stolen car is located.

VII. Advantages

Several advantages follow from embodiments of the disclosed systems. For example, some embodiments provide the advantage that navigation- and map-related features can be provided across a diverse set of geographic databases from multiple vendors. Another advantage of some of the disclosed embodiments is that the keyword server can allow Internet mapping engines, navigation systems, and cell phone users to operate at the keyword level, while behind the scenes at the technical level, location information is interchanged. Some of the disclosed embodiments provide the advantage of a common user interface for industry-wide applications and simplify the human-computer interaction.

It is intended that the foregoing detailed description be regarded as illustrative rather than limiting and that it is understood that the following claims including all equivalents are intended to define the scope of the invention.

We claim:

1. A method of scheduling deliveries comprising:
   registering a keyword for a delivery driver wherein the keyword comprises a unique alphanumeric word;
   for each delivery,
   registering a keyword for the delivery including associating a unique alphanumeric word for said delivery; and
   associating data indicating a location with respect to a geographic map database to the unique alphanumeric word associated with the delivery;
   associating the keyword for the delivery driver with the keywords registered for each of the deliveries;
   providing a route calculation application with the data indicating a location with respect to a geographic map database from each of the keywords associated with each of the deliveries; and
   calculating a delivery route with said route calculation application that visits each of the locations.

2. The method of claim 1 further comprising the step of registering another keyword for another delivery driver including storing a unique alphanumeric word for the other delivery driver.

3. The method of claim 1 wherein said data indicating a location with respect to a navigable map database identify a data entity in said navigable map database that represents a road segment.

4. The method of claim 1 wherein said data indicating a location with respect to a navigable map database identify a data entity in said navigable map database that represents a road segment and a position along the road segment.

5. The method of claim 1 wherein said data indicating a location with respect to a navigable map database identify a data entity in said navigable map database that represents a road segment, a position along the road segment, and a side of the road segment.

6. A method of claim 1 scheduling deliveries comprising:
   registering a keyword for a delivery driver wherein the keyword comprises a unique alphanumeric word;
   for each delivery,
   registering a keyword for the delivery including associating a unique alphanumeric word for said delivery; and
   associating data indicating a location with respect to a geographic map database to the unique alphanumeric word associated with the delivery;
   associating the keyword for the delivery driver with the keywords registered for each of the deliveries;
   providing a route calculation application with the data indicating a location with respect to a geographic map database from each of the keywords associated with each of the deliveries; and
   calculating a delivery route with said route calculation application that visits each of the locations,
   wherein each keyword for a delivery is also associated with a time period during which the delivery is to be made and wherein the route calculated by the route calculation application visits each delivery location within the time period during which the delivery is to be made.

7. The method of claim 1 wherein each keyword for a delivery is also associated with an indication of a time at which the delivery was ordered and wherein the route calculated by the route calculation application visits each delivery location in sequence according to when the delivery was ordered.

8. The method of claim 1 wherein at least some of said keywords for deliveries are also associated with special instructions for making the associated delivery; and providing said special instructions associated with the delivery to the delivery driver when the associated delivery is being made.

9. The method of claim 1 further comprising:

storing the keyword for the delivery driver on a server; and storing the keywords for each of the deliveries on said server.

10. The method of claim 1 wherein said step of providing further comprises:

providing the route calculation application with the keyword for the delivery driver;

using the keyword for the delivery driver to obtain the keywords associated with the deliveries associated therewith; and obtaining from each of the keywords associated with the deliveries the data indicating the location with respect to a navigable map database, whereby the route calculation application calculates a route that visits each of the delivery locations.

11. A method of scheduling real estate showings comprising:

registering a keyword on a server for each of a plurality of real estate listings, wherein the keyword for each real estate listing comprises a unique alphanumeric word;

associating map reference data with each keyword registered for a real estate listing, wherein said map reference data identify a location of the listed real estate property with respect to data contained in a navigable map database;

selecting a subset of said plurality of real estate listings for visiting within a period of time;

providing the keywords associated with the subset of said plurality of real estate listings to a route calculation application; and obtaining a route from said route calculation application wherein the route includes visits to the locations of each real estate property of the subset.

12. The method of claim 11 further comprising the steps of:

associating a unique keyword with the subset; and wherein said step of providing the keywords associated with the subset of said plurality of real estate listings to a route calculation application comprises providing the unique keyword for the subset to the route calculation application.

13. The method of claim 11 wherein said map reference data identify a data entity in said navigable map database that represents a road segment.

14. The method of claim 11 wherein said map reference data identify a data entity in said navigable map database that represents a road segment and a position along the road segment.

15. The method of claim 11 wherein said map reference data identify a data entity in said navigable map database that represents a road segment, a position along the road segment, and a side of the road segment.

16. An application that allows a person to follow another person's route comprising:

traveling in a vehicle with a positioning system that determines a current location of said vehicle;

registering keywords periodically while traveling, wherein each keyword comprises a unique alphanumeric word and wherein each keyword is associated with data indicating the location of the vehicle at a time the keyword was registered;

registering a container keyword that refers to each of the keywords registered while traveling; and providing the container keyword to a route calculation application to calculate a route, wherein the route travels through each location associated with a keyword referred to by the container keyword.

17. The method of claim 16 wherein said data indicating a location associated with each of said keywords includes geographic coordinates.

18. The method of claim 16 wherein said data indicating a location associated with each of said keywords includes a map reference that identifies a data entity in a navigable map database that represents a road segment.

19. The method of claim 16 wherein said route travels through each location associated with the keywords referred to by the container keyword in an order that corresponds to the order in which the keywords were registered.

20. A method of associating keywords with a plurality of physical locations comprising:

providing a program on a server that allows a user to reserve a plurality of keywords, wherein each keyword comprises a unique alphanumeric word; and after a period of time, associating a separate specific map location with each of said plurality of keywords.

* * * * *